(12) United States Patent
Hayasaka et al.

(10) Patent No.: US 9,131,222 B2
(45) Date of Patent: Sep. 8, 2015

(54) PHASE DIFFERENCE DETECTION METHOD, PROGRAM, AND DEVICE

(75) Inventors: Kengo Hayasaka, Tokyo (JP); Kenji Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 372 days.

(21) Appl. No.: 13/024,054

(22) Filed: Feb. 9, 2011

(65) Prior Publication Data

US 2011/0199458 A1 Aug. 18, 2011

(30) Foreign Application Priority Data

Feb. 16, 2010 (JP) ................. P2010-031833

(51) Int. Cl.
*G06K 9/00* (2006.01)
*H04N 13/02* (2006.01)
*G06T 7/00* (2006.01)

(52) U.S. Cl.
CPC .......... *H04N 13/0232* (2013.01); *G06T 7/0075* (2013.01); *G06T 2207/10052* (2013.01)

(58) Field of Classification Search
CPC ................. H04N 13/0232; G06T 2207/10052; G06T 7/0075
USPC ............................................ 384/43; 382/154
See application file for complete search history.

(56) References Cited

U.S. PATENT DOCUMENTS

| 7,272,256 | B2 * | 9/2007 | Zhang et al. | 382/154 |
| 7,446,766 | B2 * | 11/2008 | Moravec | 345/424 |
| 7,623,726 | B1 * | 11/2009 | Georgiev | 382/255 |
| 8,045,793 | B2 * | 10/2011 | Ku et al. | 382/154 |
| 2004/0105579 | A1 * | 6/2004 | Ishii et al. | 382/154 |
| 2005/0063569 | A1 * | 3/2005 | Colbert et al. | 382/118 |
| 2008/0069453 | A1 * | 3/2008 | Abe et al. | 382/209 |
| 2008/0095459 | A1 * | 4/2008 | Vitsnudel et al. | 382/260 |
| 2008/0112592 | A1 * | 5/2008 | Wu et al. | 382/103 |
| 2008/0117316 | A1 * | 5/2008 | Orimoto | 348/240.3 |
| 2008/0218597 | A1 * | 9/2008 | Cho | 348/222.1 |
| 2008/0219654 | A1 * | 9/2008 | Border et al. | 396/89 |
| 2008/0259201 | A1 * | 10/2008 | Iijima et al. | 348/345 |

(Continued)

FOREIGN PATENT DOCUMENTS

| CN | 101375315 A | 2/2009 |
| CN | 101500085 A | 8/2009 |

(Continued)

OTHER PUBLICATIONS

Li-Fu Ding, Shao-Yi Chien, and Liang-Gee Chen, "720×480 30fps Efficient Prediction Core Chip for Stereo Video Hybrid Coding System," 2005, Asian Solid-State Circuits Conference.*

(Continued)

*Primary Examiner* — Richard Torrente
*Assistant Examiner* — Joseph Suh
(74) *Attorney, Agent, or Firm* — K&L Gates LLP

(57) ABSTRACT

An image processing device includes a phase difference detection portion configured to detect phase difference between parallax images by performing correlation value calculation with a plurality of parallax images, and generate phase difference distribution in an image. The phase difference detection portion performs the phase difference detection individually along two or more directions different from each other, and generates the phase difference distribution by utilizing results of the phase difference detection regarding the two or more directions.

12 Claims, 17 Drawing Sheets

(56) References Cited

U.S. PATENT DOCUMENTS

| | | | |
|---|---|---|---|
| 2009/0009660 A1* | 1/2009 | Kageyama et al. | 348/452 |
| 2009/0010530 A1* | 1/2009 | Sumitomo | 382/154 |
| 2009/0034941 A1* | 2/2009 | Kageyama et al. | 386/126 |
| 2009/0041336 A1 | 2/2009 | Ku et al. | |
| 2009/0074316 A1* | 3/2009 | Morita et al. | 382/255 |
| 2009/0174804 A1* | 7/2009 | Iijima et al. | 348/340 |
| 2009/0185801 A1* | 7/2009 | Georgiev et al. | 396/332 |
| 2009/0190022 A1* | 7/2009 | Ichimura | 348/340 |
| 2009/0295829 A1* | 12/2009 | Georgiev et al. | 345/620 |
| 2009/0310880 A1* | 12/2009 | Yokoyama et al. | 382/260 |
| 2009/0316014 A1* | 12/2009 | Lim et al. | 348/222.1 |
| 2010/0066812 A1* | 3/2010 | Kajihara et al. | 348/46 |
| 2010/0141802 A1* | 6/2010 | Knight et al. | 348/240.3 |
| 2010/0156616 A1* | 6/2010 | Aimura et al. | 340/436 |
| 2010/0182484 A1* | 7/2010 | Iijima et al. | 348/340 |
| 2010/0194921 A1* | 8/2010 | Yoshioka | 348/231.99 |
| 2010/0231593 A1* | 9/2010 | Zhou et al. | 345/428 |
| 2010/0259648 A1* | 10/2010 | Iijima et al. | 348/241 |
| 2010/0321543 A1* | 12/2010 | Dicks | 348/280 |
| 2011/0026773 A1* | 2/2011 | Sumitomo et al. | 382/106 |
| 2012/0026358 A1* | 2/2012 | Hirose | 348/226.1 |

FOREIGN PATENT DOCUMENTS

| | | |
|---|---|---|
| JP | 2009-115541 | 5/2009 |
| JP | 2009-169025 | 7/2009 |
| JP | 2009-224982 | 10/2009 |
| JP | 2009-288042 | 12/2009 |
| WO | 2009/098619 A2 | 8/2009 |

OTHER PUBLICATIONS

D. Scharstein and R. Szeliski, "A Taxonomy and Evaluation of Dense Two-Frame Stereo Correspondence Algorithms", IJCV 2002.

Chinese Office Action issued Apr. 2014 for corresponding Chinese Appln. No. 201110035176.7.

Japanese Office Action issued May 7, 2014 for corresponding Japanese Appln. No. 2013-191785.

\* cited by examiner

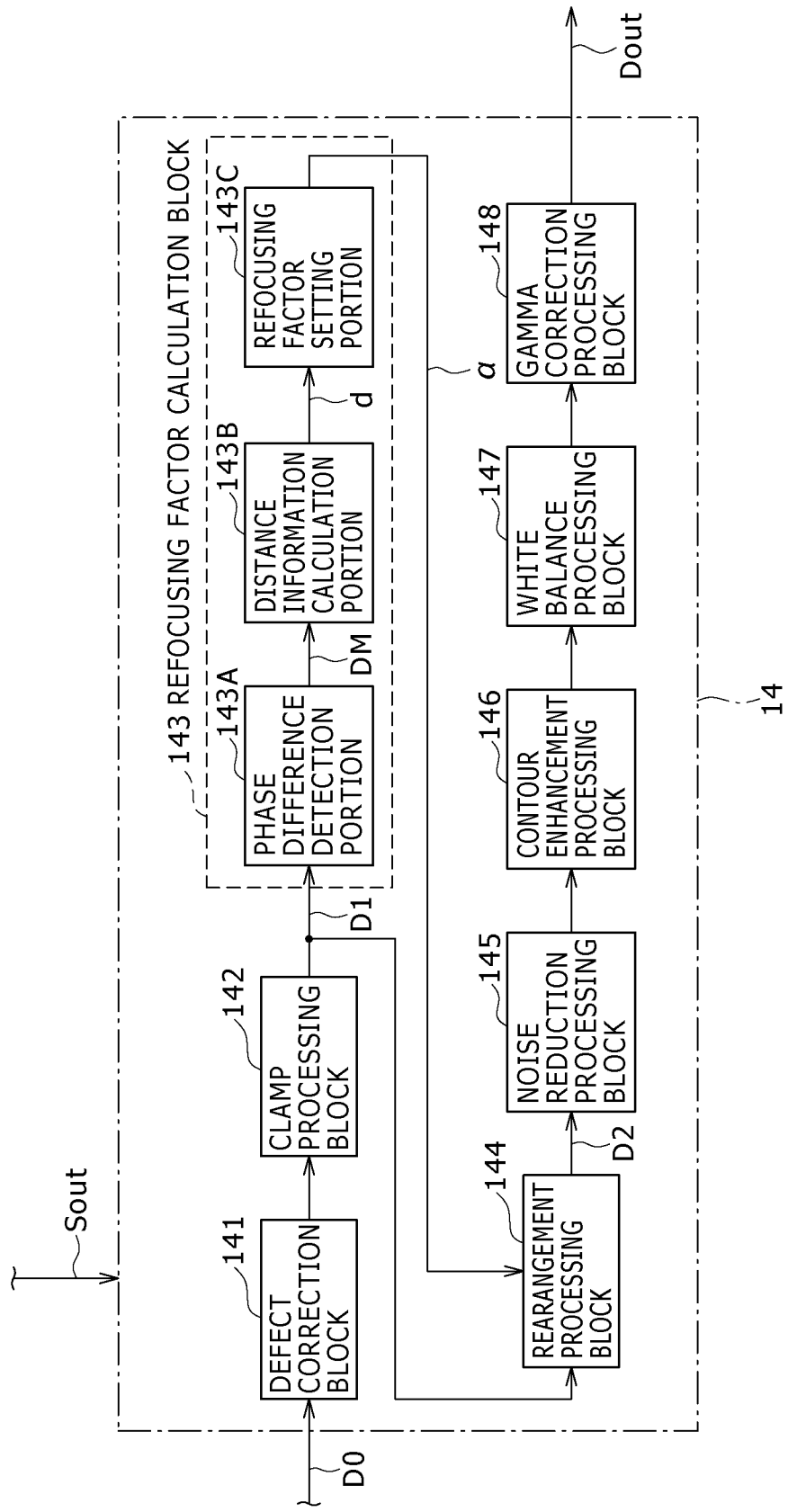

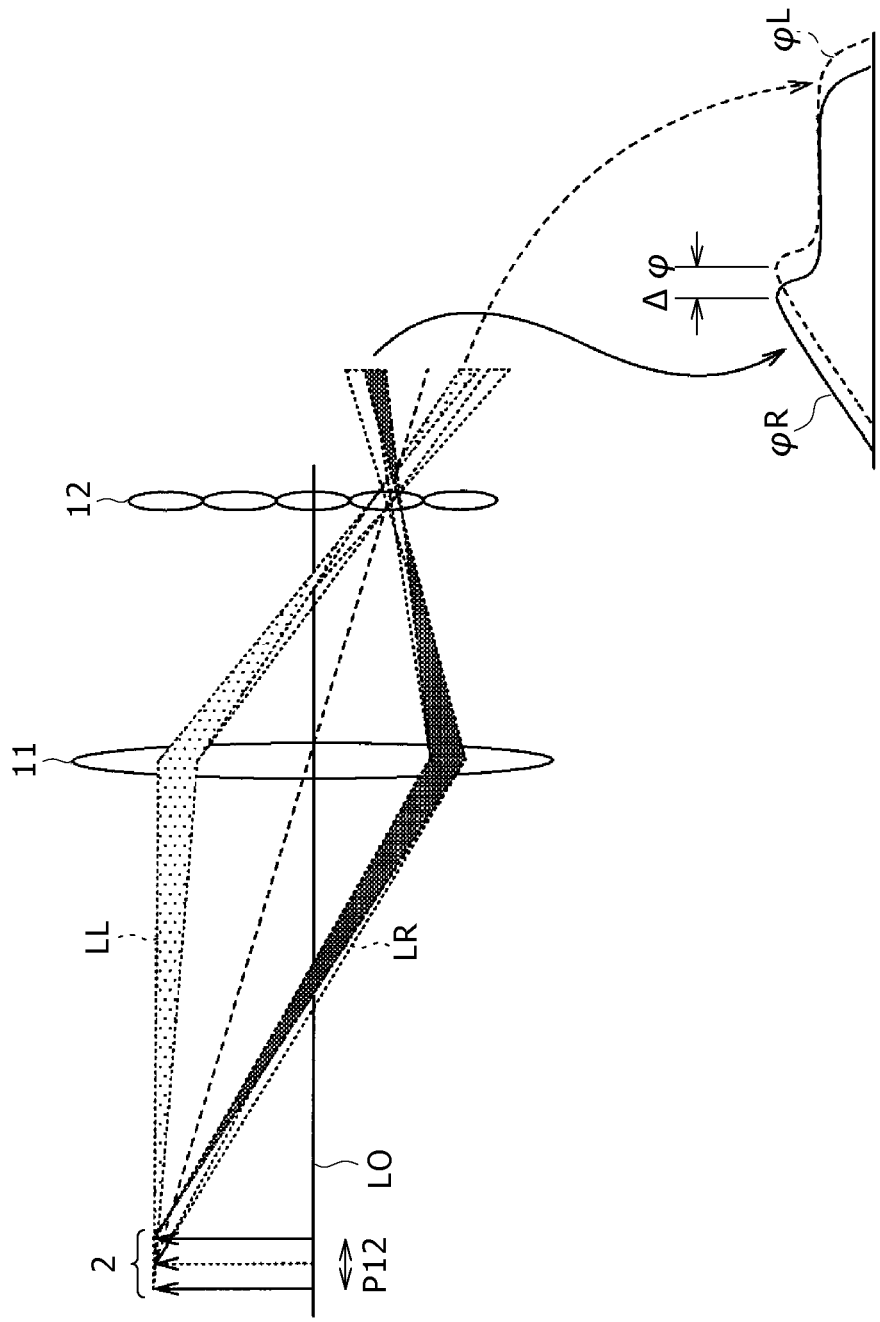

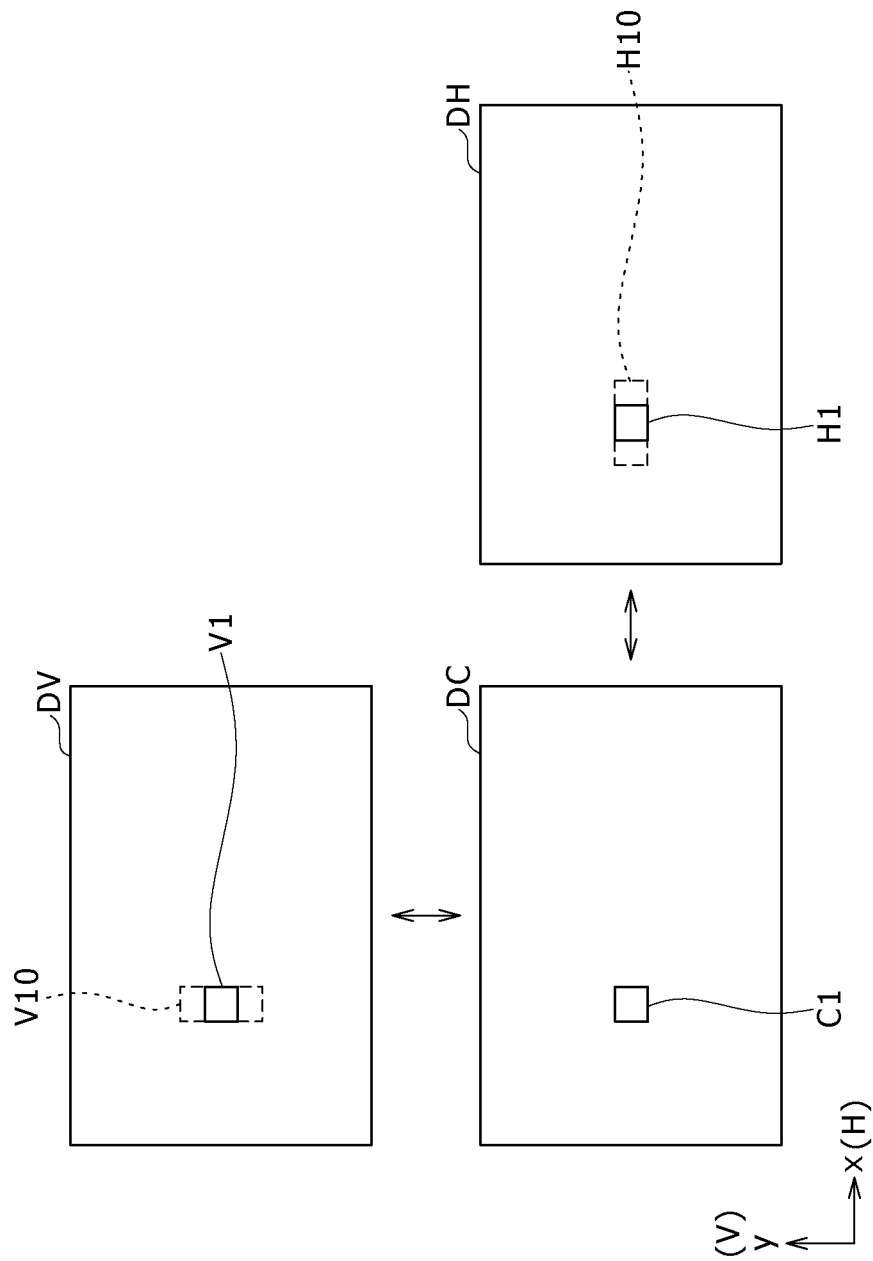

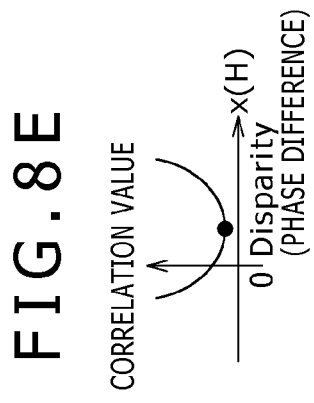
FIG. 8A
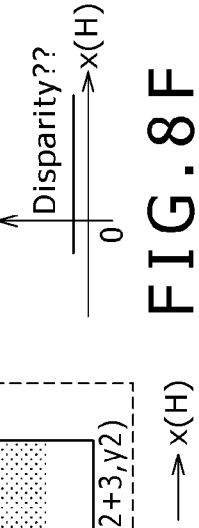
FIG. 8B
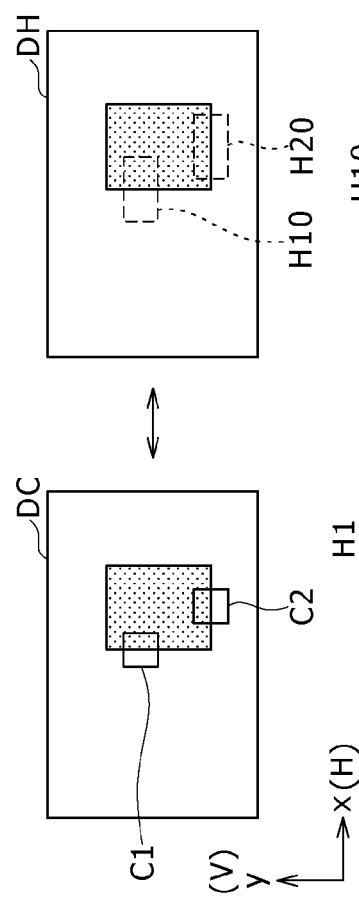
FIG. 8C
FIG. 8D
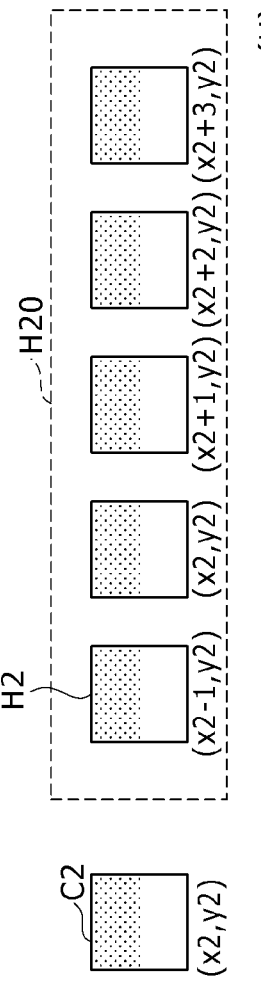
FIG. 8E
FIG. 8F

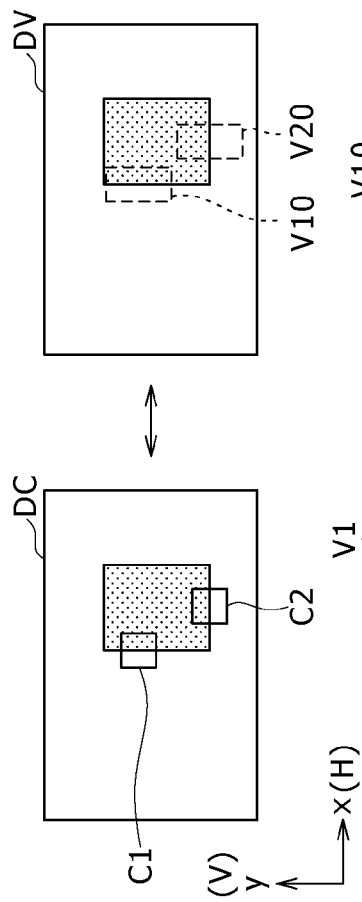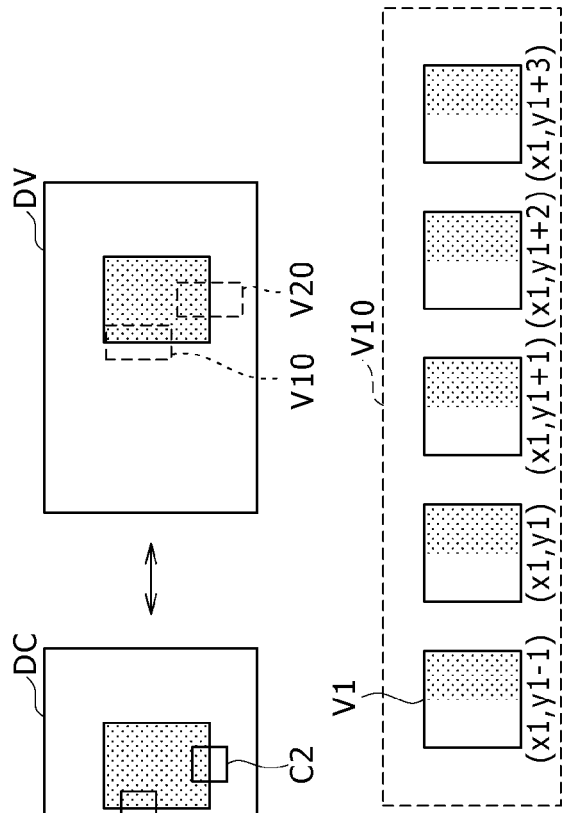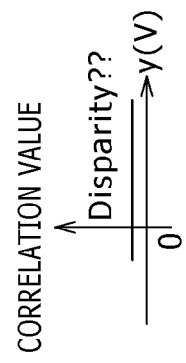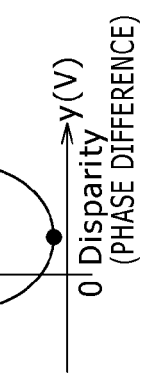

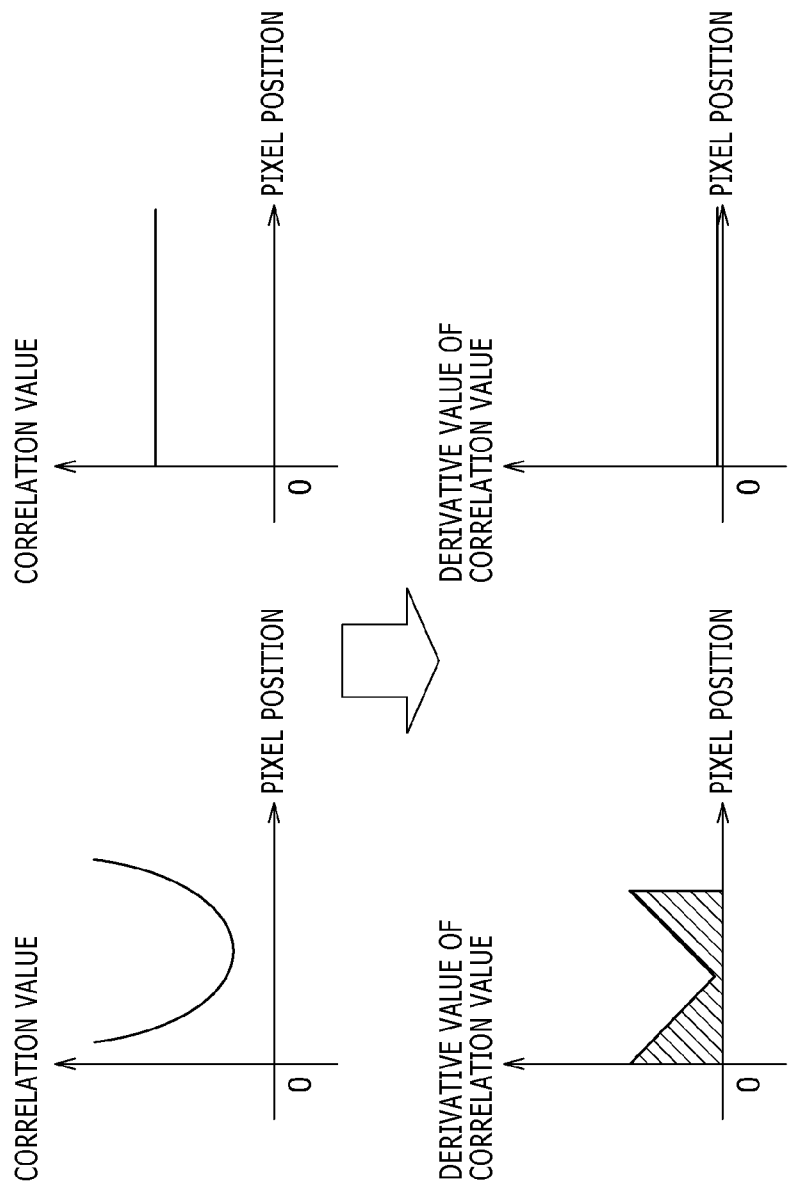

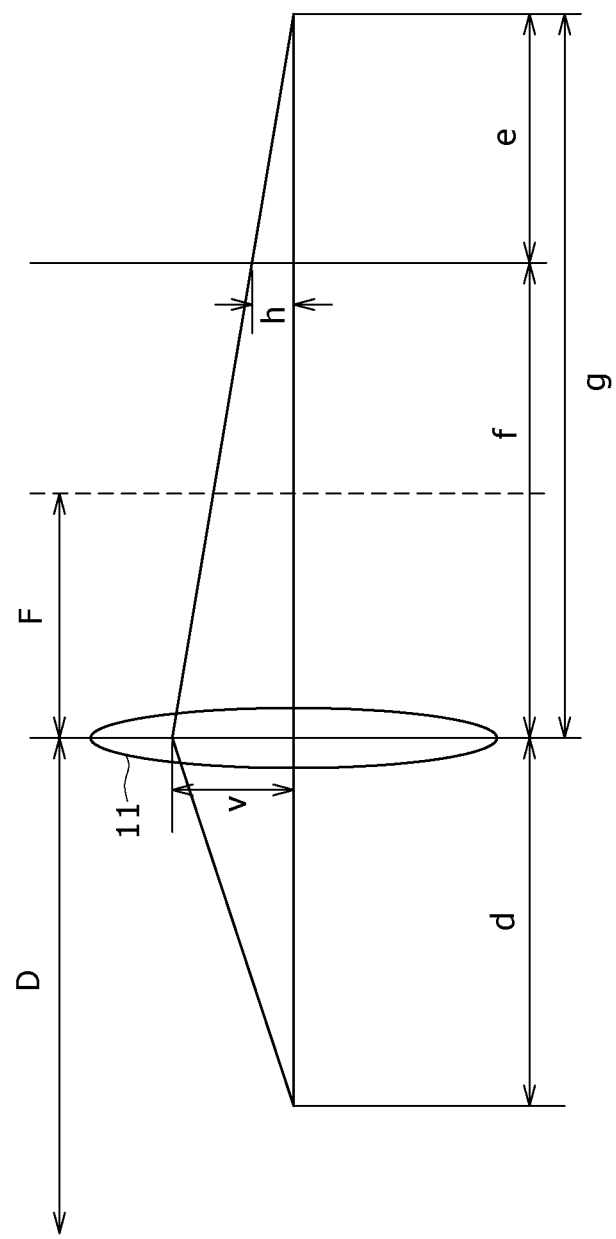

FIG.19A

|  | x-1 | x | x+1 |
|---|---|---|---|
| y-1 | -1 | -2 | -1 |
| y | 0 | 0 | 0 |
| y+1 | 1 | 2 | 1 |

|  | x-1 | x | x+1 |
|---|---|---|---|
| y-1 | 1 | 0 | -1 |
| y | 2 | 0 | -2 |
| y+1 | 1 | 0 | -1 |

(V) y ↑
└→ x(H)

PHASE DIFFERENCE DETECTION METHOD, PROGRAM, AND DEVICE

CROSS REFERENCES TO RELATED APPLICATIONS

The present application claims priority to Japanese Patent Application No. JP 2010-031833 filed on Feb. 16, 2010, the entire contents of which are being incorporated herein by reference.

BACKGROUND

The present disclosure relates to an image processing device to execute image processing with use of plural parallax images, an image processing method, an image processing program, and an imaging device including such an image processing device.

In the related art, algorithms of distance calculation by various kinds of image processing have been proposed and developed. As one among them, a distance calculation method employing a technique called block matching (stereo matching) has been proposed (refer to e.g. D. Scharstein and R. Szeliski, "A taxonomy and evaluation of dense two-frame stereo correspondence algorithms," IJCV 2002).

In this technique, the distance is calculated by image processing with use of plural parallax images having parallaxes different along a certain direction (e.g. horizontal direction). Specifically, the amount of movement of an object (phase difference between parallax images) is obtained by sequentially comparing the parallax images in a local area (obtaining a correlation value), and the distance is calculated based on this phase difference.

In such a stereo matching technique, in the case of calculating the distance from plural parallax images along the horizontal direction (H-direction) in the image, the local area (unit area) as the comparison subject is sequentially moved in the horizontal direction in the obtaining of the phase difference between parallax images. Furthermore, the positional displacement (pixel displacement) between the parallax images regarding the unit areas having the highest correlation in the comparison range is obtained as the phase difference. In the case of calculating the distance from plural parallax images along the vertical direction (V-direction) in the image, similarly the unit area as the comparison subject is sequentially moved in the vertical direction in the obtaining of the phase difference between parallax images.

However, such a related-art stereo matching technique has the following problem. Specifically, for example if an edge area is included in the image, the correct phase difference can not be obtained in this edge area, and as a result, it is difficult to achieve the correct phase difference distribution in the image. If the correctness of the phase difference distribution is low, distance information (distance distribution in the image) obtained based on the phase difference distribution is also incorrect.

This problem is attributed to the following reason. Specifically, for example if an edge area along the horizontal direction (horizontal edge area) exists, the correlation is always high (correlation value is always constant in the comparison range) although the local area as the comparison subject is moved in this edge area (moved in the horizontal direction). That is, the positional displacement between the unit areas having the highest correlation can not be uniquely decided, so that the phase difference can not be defined.

There is a need to provide an image processing device capable of generating more correct phase difference distribution compared with the related art, an image processing method, an image processing program, and an imaging device including such an image processing device.

SUMMARY

According to an embodiment, there is provided an image processing device including a phase difference detection portion configured to detect the phase difference between parallax images by performing correlation value calculation with a plurality of parallax images, and generate phase difference distribution in an image. The phase difference detection portion performs the phase difference detection individually along two or more directions different from each other, and generates the phase difference distribution by utilizing results of the phase difference detection regarding the two or more directions.

According to another embodiment, there is provided an image processing method including the step of detecting the phase difference between parallax images by performing correlation value calculation with a plurality of parallax images, and generating phase difference distribution in an image. The phase difference detection is performed individually along two or more directions different from each other, and the phase difference distribution is generated by utilizing results of the phase difference detection regarding the two or more directions.

According to another embodiment, there is provided an image processing program for causing a computer to execute processing including the step of detecting the phase difference between parallax images by performing correlation value calculation with a plurality of parallax images, and generating phase difference distribution in an image. The phase difference detection is performed individually along two or more directions different from each other, and the phase difference distribution is generated by utilizing results of the phase difference detection regarding the two or more directions.

According to another embodiment, there is provided an imaging device including an imaging optical system, and an image processing device configured to execute image processing for imaging data acquired by the imaging optical system. The image processing device has a phase difference detection portion that detects the phase difference between parallax images by performing correlation value calculation with a plurality of parallax images obtained from the imaging data directly or indirectly, and generates phase difference distribution in an image. The phase difference detection portion performs the phase difference detection individually along two or more directions different from each other, and generates the phase difference distribution by utilizing results of the phase difference detection regarding the two or more directions.

In the image processing device, the image processing method, the image processing program, and the imaging device according to the embodiments, the phase difference between parallax images is detected through the correlation value calculation with a plurality of parallax images, and the phase difference distribution in the image is generated. At this time, the phase difference detection is performed individually along two or more directions different from each other, and the phase difference distribution is generated by utilizing the results of the phase difference detection regarding these two or more directions. Due to this feature, for example even if an edge area is included in the image, the susceptibility to the influence of the edge area in the phase difference detection is lower compared with a related-art technique in which the phase difference distribution is generated based on only the result of the phase difference detection along a certain one direction.

In the image processing device, the image processing method, the image processing program, and the imaging device according to the embodiments, because the phase difference detection is performed individually along two or more directions different from each other and the phase difference distribution is generated by utilizing the results of the phase difference detection regarding these two or more directions, the susceptibility to the influence of an edge area in the phase difference detection can be lowered compared with the related art. Thus, the more correct phase difference distribution can be generated compared with the related art.

Additional features and advantages are described herein, and will be apparent from the following Detailed Description and the figures.

BRIEF DESCRIPTION OF THE FIGURES

FIG. 3 is a functional block diagram showing the schematic configuration of an image processing section shown in FIG. 1;

FIG. 6 is a schematic diagram for explaining phase difference detection processing based on two parallax images;

FIG. 7 is a schematic diagram showing three parallax images used in phase difference detection of the first embodiment;

FIGS. 8A, 8B, 8C, 8D, 8E and 8F are schematic diagrams for explaining the phase difference detection processing in the horizontal direction with parallax images including edge areas;

FIGS. 9A, 9B, 9C, 9D, 9E and 9F are schematic diagrams for explaining the phase difference detection processing in the vertical direction with parallax images including edge areas;

FIGS. 13A, 13B, 13C and 13D are schematic diagrams for explaining another example of the reliability determination processing shown in FIG. 11;

FIG. 14 is a schematic diagram for explaining a method for calculating the distance from an imaging lens to a measurement subject;

FIGS. 19A and 19B are schematic diagrams for explaining one example of an edge detection filter.

DETAILED DESCRIPTION

Embodiments will be described in detail below with reference to the drawings. The order of the description is as follows.

1. First Embodiment (example of operation of generating phase difference distribution by using reliability determination processing)

2. Second Embodiment (example of operation of generating phase difference distribution by using edge detection processing)

3. Application Example (example of application of imaging device to digital camera etc.)

4. Modification Examples

First Embodiment

[Entire Configuration of Imaging Device 1]

Figure 1:
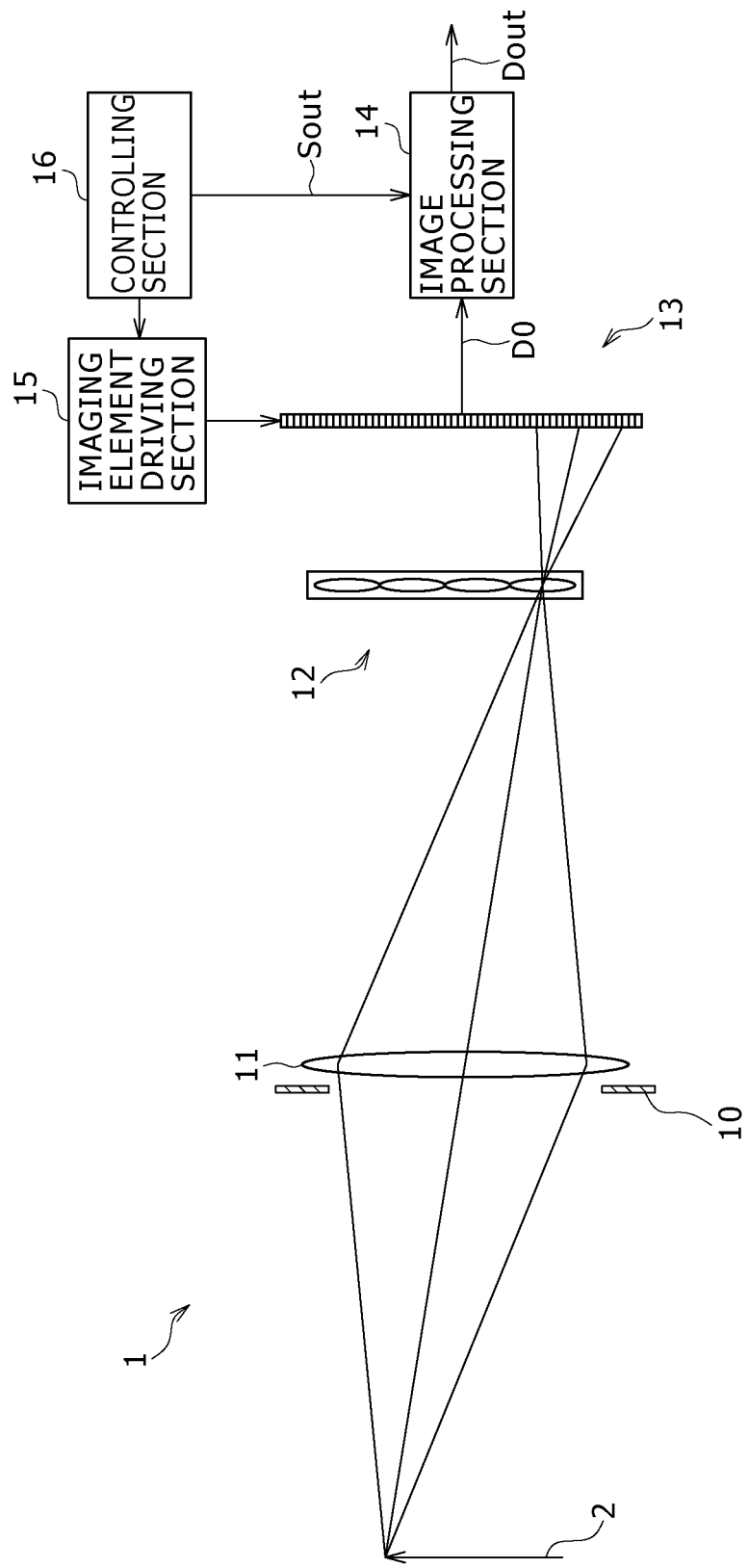
FIG. 1 is a diagram showing the entire configuration of an imaging device according to a first embodiment.

FIG. 1 shows the entire configuration of an imaging device (imaging device 1) according to a first embodiment. The imaging device 1 performs imaging of an imaging object (photographic subject) 2 and executes predetermined image processing to thereby generate and output image data (imaging data) Dout. This imaging device 1 includes an imaging lens 11 having an aperture stop 10, a microlens array 12, an imaging element 13, an image processing section 14, an imaging element driving section 15, and a controlling section 16. Among them, the image processing section 14 corresponds to one specific example of the "image processing device" of the present embodiment.

An image processing method of the present embodiment (and second embodiment to be described later) is embodied in the image processing section 14 and therefore will also be described below. Furthermore, an image processing program of the present embodiment (and second embodiment to be described later) corresponds to the respective image processing functions realized in a software manner in the image processing section 14. In this case, the software is configured by a program group for making a computer carry out the respective image processing functions. For example, each program may be so used as to be incorporated in dedicated hardware in advance or may be so used as to be installed from a network or a recording medium into a general-purpose personal computer or the like.

The aperture stop 10 is the optical aperture stop of the imaging lens 11. The image of the imaging object 2 (unit image to be described later), which has a similarity shape of the aperture shape (e.g. circular shape) of this aperture stop 10, is formed on the imaging element 13 on a microlens-by-microlens basis.

The imaging lens 11 is the main lens for imaging of the imaging object 2 and is formed of e.g. a general imaging lens used in a camcorder, a still camera, etc.

The microlens array 12 is obtained through two-dimensional arrangement of plural microlenses and is disposed at the focal plane (image forming plane) of the imaging lens 11. Each microlens has e.g. a circular planar shape and is formed of e.g. a solid-state lens, a liquid crystal lens, or a diffractive lens.

Figure 2A:
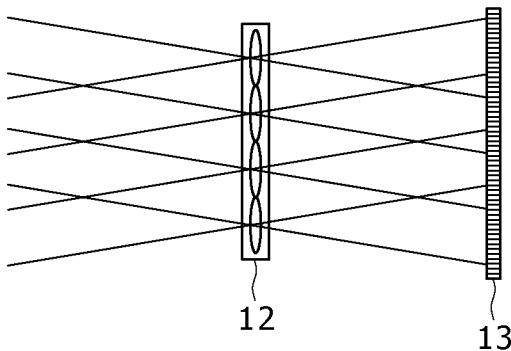
FIGS. 2A and 2B are schematic diagrams for explaining the F-number of a microlens array.
Figure 2B:
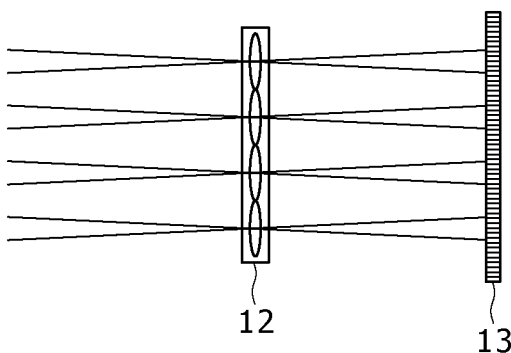

It is preferable that the F-number $F_{ML}$ of the imaging lens 11 be substantially equal to the F-number $F_{MLA}$ of the microlens array 12. This is because of the following reason. As shown in FIG. 2A, imaging light beams by adjacent microlenses overlap with each other if the F-number $F_{ML}$ of the imaging lens 11 is smaller than the F-number $F_{MLA}$ of the microlens array 12 ($F_{ML} < F_{MLA}$). In this case, crosstalk occurs, so that the image quality of the reconstructed image is deteriorated. On the other hand, as shown in FIG. 2B, imaging pixels that do not receive the imaging light beam by the microlens exist if the F-number $F_{ML}$ of the imaging lens 11 is larger than the F-number $F_{MLA}$ of the microlens array 12 ($F_{ML} > F_{MLA}$). In this case, the imaging pixels can not be sufficiently utilized and thus the number of pixels of the reconstructed image is decreased.

The imaging element 13 receives light beams from the microlens array 12 to acquire imaging data D0 including plural pixel data, and is disposed at the focal plane (image forming plane) of the microlens array 12. This imaging element 13 is formed of plural two-dimensional solid-state imaging elements arranged in a matrix, such as charge coupled devices (CCD) or complementary metal oxide semiconductor (CMOS) elements.

On the light receiving plane of such an imaging element 13 (plane on the side of the microlens array 12), M×N (M and N are each an integer) imaging pixels (hereinafter, referred to simply as pixels) are arranged in a matrix. Furthermore, one microlens in the microlens array 12 is allocated to plural pixels. For example, the number of pixels on the light receiving plane is M×N=3720×2520=9374400, and one microlens is allocated to m×n=12×12=144 pixels. As the values of the numbers m and n of pixels allocated to each microlens become larger, the resolving power for the reconstructed image to be described later, such as the resolving power in an arbitrary field of view and the resolving power in the depth direction based on refocusing calculation processing (resolving power at an arbitrary focal point), becomes higher. On the other hand, (M/m) and (N/n) have relation to the resolution of the reconstructed image. Therefore, as the values of (M/m) and (N/n) become larger, the resolution of the reconstructed image becomes higher. As just described, the resolving power for the reconstructed image and the resolution of the reconstructed image are in a trade-off relationship. However, both the resolving power and the resolution can have high values based on a favorable balance.

On the light receiving plane of the imaging element 13, e.g. color filters (not shown) may be two-dimensionally arranged on a pixel-by-pixel basis. As the color filters, e.g. color filters (primary color filters) of the Bayer arrangement, obtained through arrangement of color filters of three primary colors of red (R), green (G), and blue (B) in a checkered manner with a ratio of R:G:B=1:2:1, can be used. Providing such color filters can turn imaging data obtained by the imaging element 13 to pixel data of the plural colors (in this case, three primary colors) corresponding to the colors of the color filters.

The image processing section 14 executes predetermined image processing to be described later for the imaging data D0 obtained by the imaging element 13, to thereby generate the image data Dout. The detailed configuration of this image processing section 14 will be described later.

The imaging element driving section 15 drives the imaging element 13 and controls the light receiving operation thereof.

The controlling section 16 controls the operation of the image processing section 14 and the imaging element driving section 15. The control of the operation of the image processing section 14 is carried out by using a control signal Sout. The controlling section 16 is formed of e.g. a microcomputer.

[Detailed Configuration of Image Processing Section 14]

With reference to FIG. 3, the detailed configuration of the image processing section 14 will be described below. FIG. 3 shows the functional block configuration of the image processing section 14. The image processing section 14 has a defect correction block 141, a clamp processing block 142, a refocusing factor calculation block 143, a rearrangement processing block 144, a noise reduction processing block 145, a contour enhancement processing block 146, a white balance processing block 147, and a gamma correction processing block 148.

The defect correction block 141 corrects defects such as blocked-up shadows included in the imaging data D0 (defects attributed to the anomaly of the element itself of the imaging element 13).

The clamp processing block 142 executes processing of setting the black level of each pixel data (clamp processing) for the imaging data resulting from the defect correction by the defect correction block 141. For the imaging data resulting from the clamp processing, color interpolation processing such as demosaic processing may be further executed.

(Refocusing Factor Calculation Block 143)

The refocusing factor calculation block 143 calculates a refocusing factor α used in rearrangement processing in the rearrangement processing block 144 to be described later based on imaging data D1 supplied from the clamp processing block 142. The refocusing factor α corresponds to a factor defined when a specified depth plane in the captured image corresponding to the imaging data D1 is employed as the refocusing plane.

This refocusing factor calculation block 143 has a phase difference detection portion 143A, a distance information calculation portion 143B, and a refocusing factor setting portion 143C.

The phase difference detection portion 143A generates (calculates) phase difference distribution (disparity map to be described later) DM to be described later based on the imaging data D1. The distance information calculation portion 143B calculates distance information d (information on the distance from the imaging lens 11 to the refocusing plane to be described later) to be described later based on the phase difference distribution DM. The refocusing factor setting portion 143C sets (calculates) the refocusing factor α based on the distance information d. Detailed description of the operation of the refocusing factor calculation block 143 will be made later.

The rearrangement processing block 144 executes predetermined rearrangement processing to be described later for the imaging data D1 supplied from the clamp processing block 142 by using the refocusing factor α calculated in the refocusing factor calculation block 143, to thereby generate image data D2. As this rearrangement processing, refocusing calculation processing employing a technique called "light field photography" to be described later is used in this embodiment. Detailed description of the operation of the rearrangement processing block 144 will be made later.

The noise reduction processing block 145 executes processing of reducing noise included in the image data D2 supplied from the rearrangement processing block 144 (e.g. noise generated in imaging at a dark place or a place where the sensitivity is insufficient).

The contour enhancement processing block 146 executes contour enhancement processing for highlighting the contour of video for the image data supplied from the noise reduction processing block 145.

The white balance processing block 147 executes adjustment processing (white balance processing) of the color balance dependent on e.g. the illumination condition and individual difference in device characteristics such as the passage characteristics of the color filters and the spectral sensitivity of the imaging element 13, for the image data supplied from the contour enhancement processing block 146.

The gamma correction processing block 148 performs predetermined gamma correction (correction of brightness and contrast) for the image data supplied from the white balance processing block 147, to thereby generate the image data Dout.

[Operation and Effects of Imaging Device 1]

The operation and effects of the imaging device 1 of the present embodiment will be described below.

(1. Basic Operation)

Figure 4:
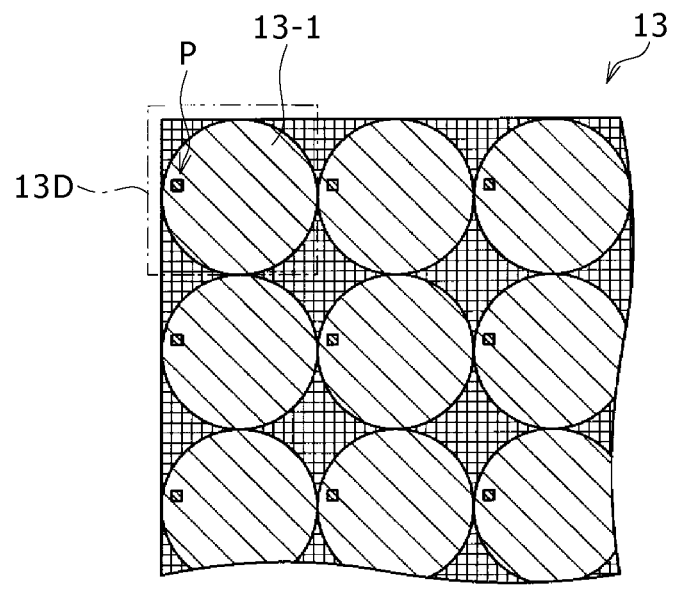
FIG. 4 is a plan view showing the light receiving region on an imaging element shown in FIG. 1.

In this imaging device 1, as shown in FIG. 1, the image of the imaging object 2 by the imaging lens 11 is formed on the microlens array 12. Furthermore, the light beam incident on the microlens array 12 is received by the imaging element 13 via this microlens array 12. At this time, the light beam incident on the microlens array 12 is received at a different position on the imaging element 13 depending on its traveling direction. As a result, for example as shown in FIG. 4, an image (unit image) 13-1 of the imaging object 2, having a similarity shape of the aperture shape of the aperture stop 10, is formed on a microlens-by-microlens basis. This unit image 13-1, i.e. the area configured by pixels P allocated to one microlens (reconstruction pixel area 13D), is equivalent to one pixel of the reconstructed image.

Figure 5:
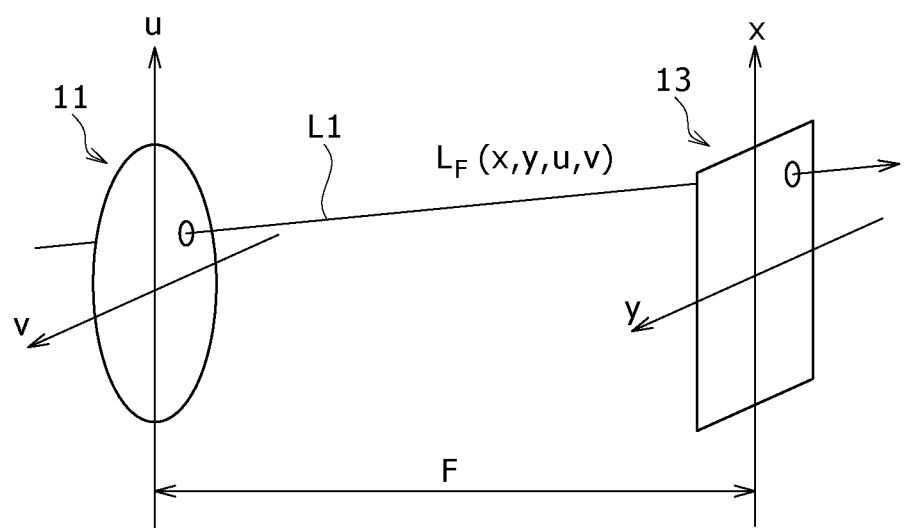
FIG. 5 is a schematic diagram for explaining a light beam received on the imaging element.

With reference to FIG. 5, the light beam received by the imaging element 13 will be described below. As shown in FIG. 5, an orthogonal coordinate system (u, v) is assumed on the imaging lens plane of the imaging lens 11 and an orthogonal coordinate system (x, y) is assumed on the imaging plane of the imaging element 13. In addition, the distance between the imaging lens plane of the imaging lens 11 and the imaging plane of the imaging element 13 is defined as F. In this case, a light beam L1 passing through the imaging lens 11 and the imaging element 13 is represented by a four-dimensional function $L_F(x, y, u, v)$. Thus, recording to the imaging element 13 is made in such a state that the traveling direction of the light beam is retained in addition to position information of the light beam. That is, the incident direction of the light beam is determined by the arrangement of the plural pixels P allocated to each microlens.

When the light is thus received by the imaging element 13, the imaging data D0 is obtained in accordance with driving operation by the imaging element driving section 15 and input to the image processing section 14. The image processing section 14 executes the predetermined image processing to be described later for this imaging data D0. Thereby, the image data Dout is generated in the imaging device 1 and output to the external.

(2. Image Processing Operation)

With reference to FIG. 3 and FIGS. 6 to 16, the image processing operation in the image processing section 14 (particularly, operation of the refocusing factor calculation block 143) will be described in detail below, through comparison with a comparative example.

As shown in FIG. 3, in the image processing section 14, the defect correction block 141 performs defect correction for the imaging data D0, and thereafter the clamp processing block 142 executes clamp processing for the imaging data resulting from the defect correction. Thereby, the imaging data D1 resulting from the clamp processing is input to the refocusing factor calculation block 143.

(2-1. Operation of Refocusing Factor Calculation)

Subsequently, the refocusing factor calculation block 143 calculates the refocusing factor α based on this imaging data D1 in the following manner.

(Operation of Phase Difference Detection)

Specifically, the phase difference detection portion 143A generates plural (e.g. three or more) parallax images having parallaxes different from each other (arbitrary-viewpoint images from different viewpoints) based on the imaging data D1. The parallax image for detecting the phase difference can be generated by extracting and combining the pixel data acquired from the pixels P disposed at the same position in the unit images received on the imaging element 13. Therefore, the number of generated parallax images is the same as the number of pixels allocated to one microlens.

The phase difference detection portion 143A detects the phase difference between parallax images by performing correlation value calculation to be described below with the plural generated parallax images, and generates the phase difference distribution (disparity map) DM indicating the phase difference of each unit area (e.g. each pixel P) in the image. Specifically, for example in the case of left and right two parallaxes like those shown in FIG. 6, the phase difference $\Delta\phi$ between a parallax image by a right-side light beam LR and a parallax image by a left-side light beam LL (phase difference between the phase $\phi R$ of the parallax image by the light beam LR and the phase $\phi L$ of the parallax image by the light beam LL) is detected.

More specifically, in the present embodiment, for example as shown in FIG. 7, the phase difference distribution DM is generated by using plural parallax images (three parallax images DC, DH, and DV) along two or more directions different from each other (two directions of the horizontal (H) direction and the vertical (V) direction in the image). Two parallax images DC and DH have a parallax with respect to each other in the horizontal direction, and two parallax images DC and DV have a parallax with respect to each other in the vertical direction.

In the detection of the phase difference between such two parallax images (generation of the phase difference distribution DM), e.g. the following stereo matching technique is used. Specifically, in this technique, the amount of movement of an object (phase difference between parallax images) is obtained by sequentially making comparison between two parallax images in a local area (obtaining a correlation value (pixel correlation value) indicating the similarity between images).

Concretely, for example in the case of obtaining the phase difference between two parallax images DC and DH along the horizontal direction, the phase difference distribution DM is generated in the following manner. Specifically, first, the unit area (partial image C1 in FIG. 7: center coordinates (x1, y1)) in one parallax image DC is picked out and the position thereof is fixed. Subsequently, the unit area as the comparison subject (partial image H1 in FIG. 7: center coordinates (x1, y1)) in the other parallax image DH is picked out, and the correlation value is sequentially calculated with sequential movement of the position of this partial image H1 in the horizontal direction in a comparison range H10. Furthermore, the positional displacement (pixel displacement) between the partial images C1 and H1 when the correlation is the highest in this comparison range H10 is obtained as the phase difference (disparity). Such calculation processing is repeatedly executed for the entire surface of the parallax images DC and DH with changes of the position of the partial image C1. Thereby, the above-described phase difference distribution DM (set of disparities) is obtained. Also in the case of obtaining the phase difference between two parallax images DC and DV along the vertical direction, the phase difference distribution DM is generated in a similar manner. Specifically, first, the partial image C1 in the parallax image DC and a partial image V1 in the parallax image DV are picked out, and the correlation value is sequentially calculated with sequential movement of the position of the partial image V1 in the vertical direction in a comparison range V10. Such calculation processing is repeatedly executed for the entire surface of the parallax images DC and DV with changes of the position of the partial image C1. Thereby, the phase difference distribution DM is generated.

At this time, various expressions can be used as the formula for calculation of the correlation value. Representative expressions are formulae (1) to (3) shown below. Specifically, the SAD (sum of absolute difference) prescribed by formula (1), the SSD (sum of squared difference) prescribed by formula (2), the NCC (normalized cross-correlation) prescribed by formula (3), etc. can be used as the correlation value. In formulae (1) to (3), $I_1$ and $I_2$ each denote the pixel value in the parallax image. In the case of the SAD and the SSD, a smaller value (value closer to 0) indicates a higher correlation and a larger value (value closer to $\infty$) indicates a lower correlation. In the case of the NCC, a value closer to 1 indicates a higher correlation and a value closer to 0 indicates a lower correlation.

SAD (Sum of Absolute Difference)

$$\Sigma_{i,j} \text{abs}(I_1(x+i, y+j) - I_2(x+i+d, y+j)) \quad (1)$$

SSD (Sum of Squared Difference)

$$\Sigma_{i,j}(I_1(x+i, y+j) - I_2(x+i+d, y+j))^2 \quad (2)$$

NCC (Normalized Cross-Correlation)

$$\frac{\Sigma_{i,j}(I_1(x+i, y+j) \times I_2(x+i+d, y+j))}{Sqrt(\Sigma_{i,j}(I_1(x+i, y+j)^2)) \times Sqrt(\Sigma_{i,j}(I_2(x+i+d, y+j)^2))} \quad (3)$$

Comparative Example

However, in such a related-art stereo matching technique, the following problem occurs if an edge area is included in the image for example.

FIGS. 8A to 8F schematically show one example of phase difference detection processing in the horizontal direction with the parallax images DC and DH including edge areas. In the diagram, the partial image C1 (center coordinates (x1, y1)) and the comparison range H10 along the horizontal direction are located around a vertical edge area of the same object. On the other hand, a partial image C2 (center coordinates (x2, y2)) and a comparison range H20 are located around a horizontal edge area of the same object. As the correlation value shown in FIGS. 8E and 8F, the above-described SSD is employed as one example. In the case of such phase difference detection in the horizontal direction, as shown in FIGS. 8C and 8E, the phase difference is correctly detected in the vertical edge area. In contrast, as shown in FIGS. 8D and 8F, the phase difference can not be detected in the horizontal edge area. This is attributed to the following reason. Specifically, although a unit image H2 is moved in the comparison range H20 located around the horizontal edge area (moved in the horizontal direction) as shown in FIG. 8D, the correlation is always high (correlation value is always constant in the comparison range H20) as shown in FIG. 8F. That is, the positional displacement when the correlation is the highest can not be uniquely decided, so that the phase difference can not be defined.

On the other hand, FIGS. 9A to 9F schematically show one example of phase difference detection processing in the vertical direction with the parallax images DC and DV including edge areas for example. In the diagram, the partial image C1 (center coordinates (x1, y1)) and the comparison range V10 along the vertical direction are located around a vertical edge area of the same object. On the other hand, the partial image C2 (center coordinates (x2, y2)) and a comparison range V20 along the vertical direction are located around a horizontal edge area of the same object. As the correlation value shown in FIGS. 9E and 9F, the above-described SSD is employed as one example. In the case of such phase difference detection in the vertical direction, the opposite result to that of the above-described phase difference detection in the horizontal direction is obtained. Specifically, as shown in FIGS. 9D and 9F, the phase difference is correctly detected in the horizontal edge area. In contrast, as shown in FIGS. 9C and 9E, the phase difference can not be detected in the vertical edge area. This is attributed to the following reason. Specifically, although the unit image V1 is moved in the comparison range V10 located around the vertical edge area (moved in the vertical direction) as shown in FIG. 9C, the correlation is always high (correlation value is always constant in the comparison range V10) as shown in FIG. 9E. That is, also in this case, the positional displacement when the correlation is the highest can not be uniquely decided, so that the phase difference can not be defined.

As just described, in the related-art technique of the comparative example, if an edge area is included in the image, the correct phase difference can not be obtained in the edge area. As a result, it is difficult to obtain the correct phase difference distribution DM. This is because, in the related-art technique, the phase difference distribution DM is generated based on only the result of the phase difference detection along a certain one direction (in this case, horizontal direction or vertical direction) as shown in FIG. 8 and FIG. 9 differently from the present embodiment to be described below. If the correctness of the phase difference distribution DM is low, the distance information d (distance distribution in the image) to be described later, obtained based on the phase difference distribution DM, is also incorrect.

Figure 10A:
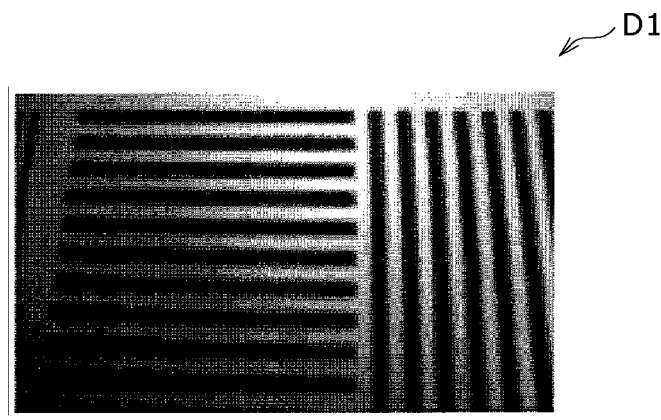
FIGS. 10A, 10B and 10C are schematic diagrams showing phase difference distribution (distance information distribution) generated by the image processing devices according to the first embodiment and a comparative example.
Figure 10B:
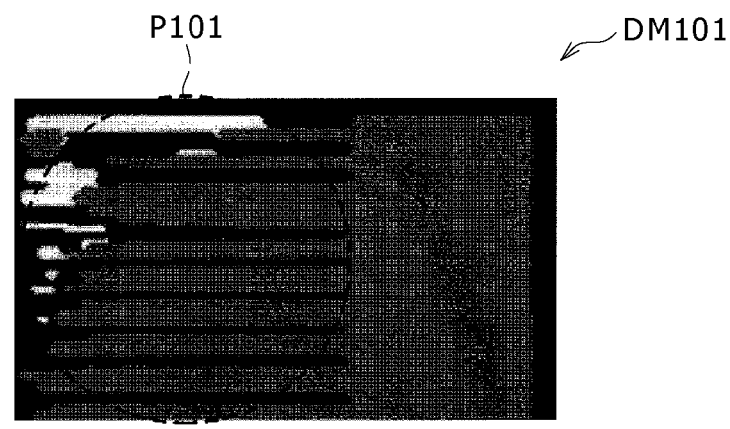

Therefore, for example if phase difference detection processing in the horizontal direction is executed based on an image (corresponding to the imaging data D1) including horizontal edge areas like that shown in FIG. 10A, the technique of the above-described comparative example results in incorrect phase difference distribution DM101 as shown in FIG. 10B for example. Specifically, because this image corresponding to the imaging data D1 is an image obtained by imaging of an object having a flat plate shape, the phase difference distribution having uniform phase difference values (distance information distribution having uniform distances) should be obtained in nature. However, according to the phase difference distribution DM101 shown in FIG. 10B relating to the comparative example, the correct phase difference is not detected in the horizontal edge areas as shown by symbol P101 in the diagram, due to the above-described reason.

Present Embodiment

Figure 10C:
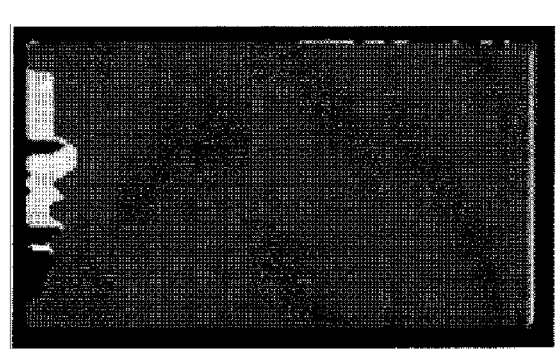

In contrast, in the present embodiment, phase difference detection processing (operation of generating the phase difference distribution DM) is executed in the phase difference detection portion 143A in the following manner. Thereby, in the present embodiment, for example even when phase difference detection processing in the horizontal direction is executed based on an image including a horizontal edge area like that shown in FIG. 10A, correct phase difference distribution DM1 is obtained as shown in FIG. 10C for example differently from the above-described comparative example. Specifically, in this case, as the phase difference distribution DM1, phase difference distribution having uniform phase difference values (distance information distribution having uniform distances) is obtained.

Concretely, the phase difference detection portion 143A executes phase difference detection processing individually along two or more directions different from each other (in this embodiment, two directions of the horizontal (H) direction and the vertical (V) direction in the image), and generates the phase difference distribution DM by utilizing the results of the phase difference detection regarding these two or more directions. Specifically, in this embodiment, as one example, the phase difference detection portion 143A executes the phase difference detection processing individually along the horizontal direction and the vertical direction in three parallax images DC, DH, and DV shown in FIG. 7, and generates the phase difference distribution DM by utilizing the result of the phase difference detection regarding the horizontal direction and the result of the phase difference detection regarding the vertical direction.

Figure 11:
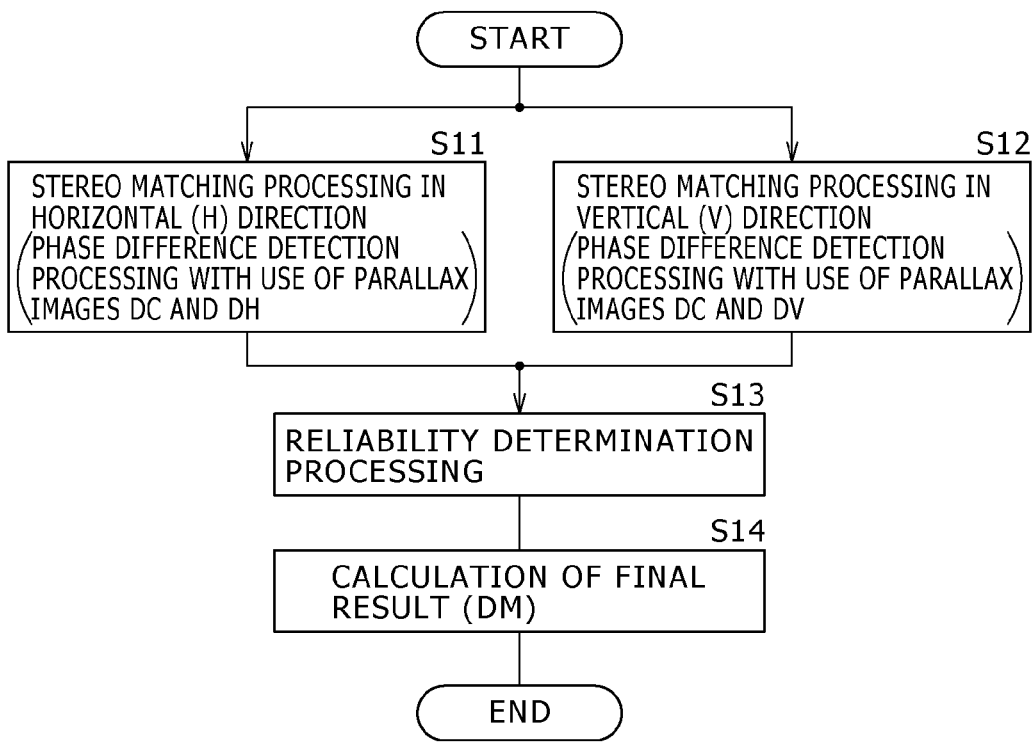
FIG. 11 is a flowchart showing operation of generating the phase difference distribution in the first embodiment.

FIG. 11 is a flowchart showing the operation of generating the phase difference distribution DM (phase difference detection processing) according to the present embodiment. As shown in FIG. 11, in generation of the phase difference distribution DM, the phase difference detection portion 143A first executes stereo matching processing in the horizontal direction as described above with reference to FIG. 7 and FIG. 8. In other words, it executes phase difference detection processing with use of the parallax images DC and DH (step S11 in FIG. 11). Furthermore, in parallel to this, the phase difference detection portion 143A executes stereo matching processing in the vertical direction as described above with reference to FIG. 7 and FIG. 9. In other words, it executes phase difference detection processing with use of the parallax images DC and DV (step S12).

Subsequently, the phase difference detection portion 143A makes a determination as to the reliability of the phase difference (reliability determination processing) for each of the results of the phase difference detection regarding two or more directions (in this embodiment, the results of the phase difference detection regarding the horizontal direction and the vertical direction) on each unit area basis (step S13). Specifically, the phase difference detection portion 143A executes the reliability determination processing based on the shape of a correlation characteristic line indicating the relationship between the pixel position and the correlation value in the correlation value calculation, like those shown in FIGS. 8E and 8F and FIGS. 9E and 9F for example. This is based on utilization of the following fact. Specifically, as shown in FIG. 8E and FIG. 9F, the correlation characteristic line is a curve (in this case, downwardly convex curve) if correct phase difference detection is performed. In contrast, as shown in FIG. 8F and FIG. 9E, the correlation characteristic line is a straight line if correct phase difference detection is not performed. As the technique of such reliability determination processing utilizing the shape of the correlation characteristic line, e.g. the following three techniques are available.

A first technique offers the reliability determination processing by use of the sharpness γ (index indicating the degree of sharpness in the shape of the correlation characteristic line) prescribed by formula (4) shown below. In this formula (4), the correlation value in a pixel position i is defined as Xi (i=1 to N (integer)), and the average and standard deviation of these correlation values Xi are defined as μ and σ, respectively. A larger value of this sharpness γ means that the correlation characteristic line has a sharper shape (curve shape), i.e. that the possibility of achievement of correct phase difference detection is higher (reliability is higher). In contrast, a smaller value of this sharpness γ means that the correlation characteristic line has a less-sharp shape (straight line shape), i.e. that the possibility of achievement of correct phase difference detection is lower (reliability is lower).

$$\gamma = \Sigma(Xi-\mu)^4/(N\sigma^4) \quad (4)$$

Figure 12:
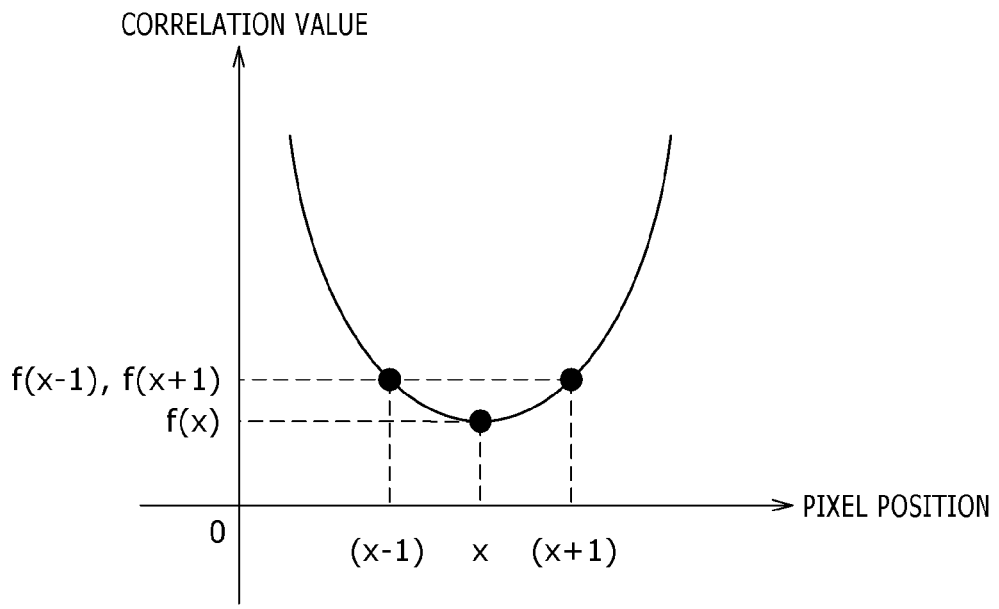
FIG. 12 is a schematic diagram for explaining one example of reliability determination processing shown in FIG. 11.

A second technique offers the reliability determination processing executed by using the difference in the correlation value between the peak in the correlation characteristic line and peripheral points thereof as shown in FIG. 12 for example. Specifically, in this technique, if the correlation values at pixel positions x, (x−1), and (x+1) are defined as f(x), f(x−1), and f(x+1), respectively, and the coefficient (constant) is defined as α, reliability R is prescribed by formula (5) shown below. A larger value of this reliability R means that the correlation characteristic line has a sharper shape (curve shape), i.e. that the possibility of achievement of correct phase difference detection is higher (reliability is higher). In contrast, a smaller value of this reliability R means that the correlation characteristic line has a less-sharp shape (straight line shape), i.e. that the possibility of achievement of correct phase difference detection is lower (reliability is lower).

$$\text{reliability } R = |\alpha \times \{f(x-1) - 2 \times f(x) + f(x+1)\}| \quad (5)$$

A third technique offers the reliability determination processing executed by using the integration value (value of integral) of the derivative values of the correlation values at the respective pixel positions as shown in FIGS. 13A to 13D for example. Specifically, for example as shown in FIGS. 13A and 13C, a larger value as this integration value of the derivative value of the correlation value (equivalent to the area value of the hatched region in FIG. 13C) means that the correlation characteristic line has a sharper shape (curve shape), i.e. that the possibility of achievement of correct phase difference detection is higher (reliability is higher). In contrast, for example as shown in FIGS. 13B and 13D, a smaller value as the integration value of the derivative value of the correlation value means that the correlation characteristic line has a less-sharp shape (straight line shape), i.e. that the possibility of achievement of correct phase difference detection is lower (reliability is lower).

At last, based on the result of the reliability determination processing in the step S13, the phase difference detection portion 143A employs the result of the phase difference detection regarding the direction of the highest reliability on each unit area basis and combines the results, to thereby generate the phase difference distribution DM as the final result (step S14). Specifically, in this embodiment, for example for the unit area about which the result of the phase difference detection regarding the horizontal direction has higher reliability compared with the result of the phase difference detection regarding the vertical direction, the result of the phase difference detection regarding the horizontal direction is employed as the final result of the phase difference detection for this unit area. In contrast, for the unit area about which the result of the phase difference detection regarding the vertical direction has higher reliability compared with the result of the phase difference detection regarding the horizontal direction, the result of the phase difference detection regarding the vertical direction is employed as the final result of the phase difference detection for this unit area. Such selection (employment) of the result of the phase difference detection is performed for the whole of the image on each unit area basis. Thereby, one phase difference distribution DM regarding the whole of the image is generated.

In this manner, in the present embodiment, the phase difference between parallax images is detected through the correlation value calculation with plural parallax images (three parallax images DC, DH, and DV), and the phase difference distribution DM in the image is generated. For this generation, the phase difference detection is individually performed along two or more directions different from each other (in this embodiment, two directions of the horizontal direction and the vertical direction in the image), and the phase difference distribution DM is generated by utilizing the results of the phase difference detection regarding the respective directions. Due to this feature, for example even if an edge area (horizontal edge area and vertical edge area) is included in the image, the susceptibility to the influence of the edge area in the phase difference detection is lower compared with the technique of the related art (comparative example), in which the phase difference distribution is generated based on only the result of the phase difference detection along a certain one direction.

(Operation of Distance Information Calculation)

Subsequently, in the refocusing factor calculation block 143, the distance information calculation portion 143B calculates the predetermined distance information d based on the phase difference distribution DM obtained in the phase difference detection portion 143A. In this embodiment, this distance information d means information on the distance from the imaging lens 11 to an arbitrary reference position in the captured image corresponding to the imaging data D1. Specifically, the distance information d refers to the distance information d between the imaging lens 11 and the refocusing plane on which an object is desired to be focused (information on the distance d from the imaging lens 11 to the above-described reference position), i.e. the object-side focal length of the imaging lens 11 in refocusing to be described later.

Concretely, the distance information calculation portion 143B calculates the distance d to the measurement subject (distance information d) by using the phase difference distribution DM in accordance with formulae (6) to (13) show below. In these formulae, as shown in FIG. 14, the object-side focal plane of the imaging lens 11 is defined as D. The focal length of the imaging lens 11 is defined as F. The size of the aperture of the imaging lens when the phase difference distribution DM is obtained is defined as v. The image-side focal plane of the imaging lens 11 when imaging of an object at the distance D is performed is defined as f. The image-side focal plane of the imaging lens 11 when imaging of an object at the distance d from the imaging lens 11 is performed is defined as g. The value of ((disparity)×(the size of the pixel P in the imaging element 13)×(the number of pixels allocated to the length of one side of the microlens array 12)) calculated by using the size v of the aperture regarding an object at the distance d is defined as h.

Specifically, first, formula (6) is obtained based on a similarity relationship. Furthermore, because a relationship of e=(g−f) is satisfied according to FIG. 14, formula (7) is obtained by substituting it into formula (6), and formula (8) is obtained from this formula (7). In addition, formulae (9) and (10) are obtained from the formula of image formation of the imaging lens 11. Thus, formula (11) is obtained by substituting formula (9) into formula (8), and formula (12) is obtained from formula (10). Therefore, formula (13) is obtained by substituting formula (12) into formula (11). Thus, if the values of F, D, and v in this formula (13) are known values, the distance d is calculated based on the phase difference distribution DM.

$$(h/e) = (v/g) \tag{6}$$

$$(h/(g-f)) = (v/g) \tag{7}$$

$$(1/g) = (1/f) \times \{1 - (h/v)\} \tag{8}$$

$$(1/F) = (1/g) + (1/d) \tag{9}$$

$$(1/F) = (1/D) + (1/f) \tag{10}$$

$$(1/d) = (1/F) - [(1/f) \times \{1 - (h/v)\}] \tag{11}$$

$$f = F \times \{D/(D-F)\} \tag{12}$$

$$(1/d) = (1/F) - \{1/[F \times D/(D-F)] \times \{1 - (h/v)\}\} \tag{13}$$

(Operation of Setting Refocusing Factor)

Figure 15A:
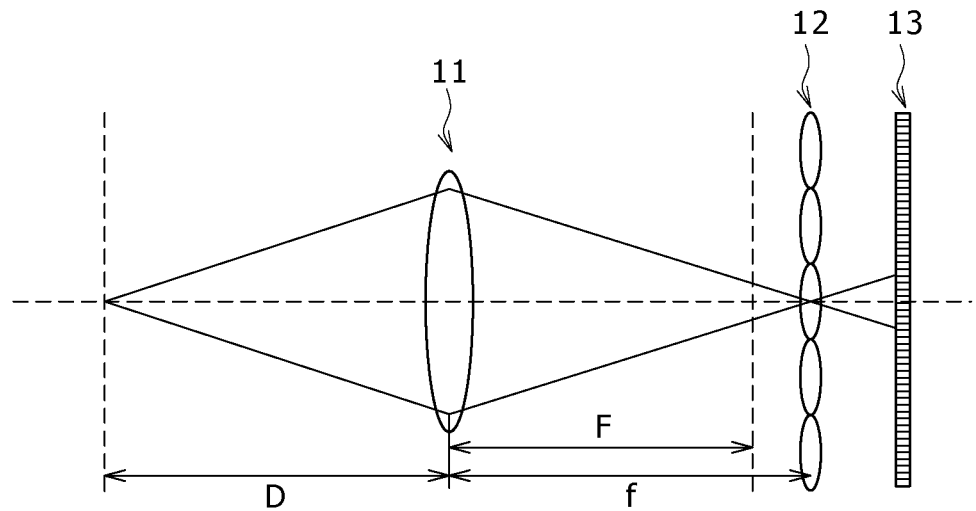
FIGS. 15A and 15B are schematic diagrams for explaining the relationship between distance information and a refocusing factor.
Figure 15B:
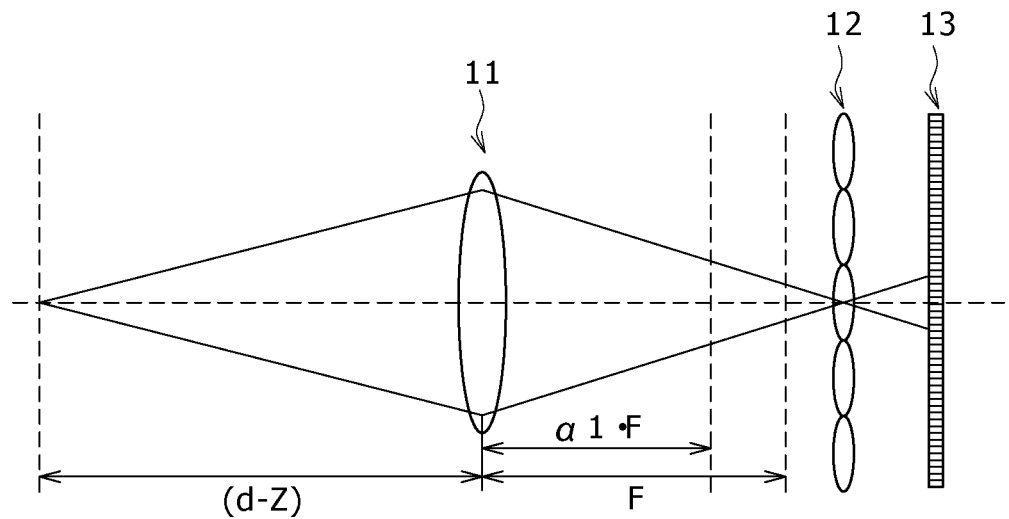

Subsequently, in the refocusing factor calculation block 143, the refocusing factor setting portion 143C sets (calculates) the refocusing factor α based on the distance information d obtained in the distance information calculation portion 143B. Concretely, the refocusing factor α is calculated in the following manner if imaging is performed in the state in which the object-side focal plane of the imaging lens 11 exists at a position separate by the distance D as shown in FIG. 15A. Specifically, as shown in FIG. 15B, the refocusing factor α for obtaining a refocused image on a plane existing at a position separate from the imaging lens 11 by the distance d is calculated from the above-described formula (10) and formula (14) shown below. The refocusing factor α thus calculated is input to the rearrangement processing block 144 together with the imaging data D1.

$$(1/F) = (1/D) + (1/\alpha f) \tag{14}$$

(2-2. Operation of Refocusing Calculation Processing)

Subsequently, the rearrangement processing block 144 executes predetermined rearrangement processing for the imaging data D1 supplied from the clamp processing block 142 by using the refocusing factor α calculated in the refocusing factor calculation block 143 in the above-described manner, to generate the image data D2. Specifically, it generates an image (reconstructed image) set at an arbitrary focal point (refocusing plane prescribed by the refocusing factor α) by executing refocusing calculation processing (integral processing) to be described below.

Figure 16:
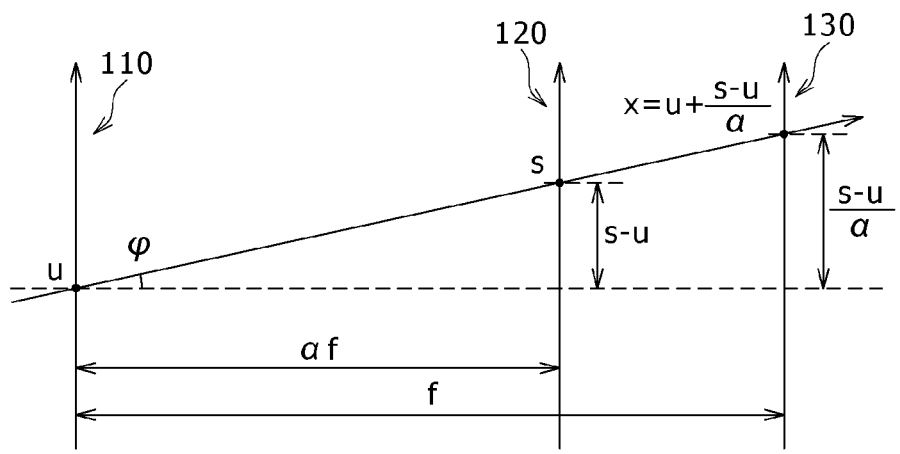
FIG. 16 is a schematic diagram for explaining refocusing calculation processing.

As shown in FIG. 16, the detection intensity $L_F'$ on an imaging plane 130 regarding coordinates (s, t) on a refocusing plane 120 prescribed by the refocusing factor α is represented by formula (15) shown below. Furthermore, an image $E_F'(s, t)$ obtained on the refocusing plane 120 arises from the integral of the detection intensity $L_F'$ with respect to the lens aperture, and thus is represented by formula (16) shown below. Therefore, the rearrangement processing block 144 can generate the reconstructed image (image data D2) set at the arbitrary focal point (refocusing plane 120 prescribed by the refocusing factor α) by executing the refocusing calculation processing by using this formula (16).

$$L_{F'}(s, t, u, v) = L_{(\alpha \cdot F)}(s, t, u, v) \quad (15)$$
$$= L_F\left(u + \frac{s-u}{\alpha}, v + \frac{t-v}{\alpha}, u, v\right)$$
$$= L_F\left\{u\left(1 - \frac{1}{\alpha}\right) + \frac{s}{\alpha}, v\left(1 - \frac{1}{\alpha}\right) + \frac{t}{\alpha}, u, v\right\}$$

$$E_{F'}(s, t) = \frac{1}{F'^2} \int \int L_{F'}(s, t, u, v) du dv \quad (16)$$
$$= \frac{1}{\alpha^2 F^2} \int \int L_F\left\{u\left(1 - \frac{1}{\alpha}\right) + \frac{s}{\alpha}, v\left(1 - \frac{1}{\alpha}\right) + \frac{t}{\alpha}, u, v\right\} du dv$$

Thereafter, first, the noise reduction processing block 145 executes noise reduction processing for the image data D2 thus generated. Subsequently, the contour enhancement processing block 146 executes contour enhancement processing for the image data resulting from the noise reduction processing. Next, the white balance processing block 147 executes color balance adjustment processing (white balance processing) for the image data resulting from the contour enhancement processing. Furthermore, the gamma correction processing block 148 executes gamma correction processing for the image data resulting from the white balance processing. Thereby, the image data Dout is generated and output from the image processing section 14.

As described above, in the present embodiment, in detection of the phase difference between parallax images through the correlation value calculation with the plural parallax images DC, DH, and DV and generation of the phase difference distribution DM in the image, the phase difference detection is performed individually along two directions of the horizontal direction and the vertical direction in the image, and the phase difference distribution DM is generated by utilizing the results of the phase difference detection regarding these two directions. Therefore, the susceptibility to the influence of an edge area in the phase difference detection can be lowered compared with the related art. Thus, the more correct phase difference distribution DM can be generated compared with the related art. As a result, the distance information d (distance information distribution) obtained based on this phase difference distribution DM can also be obtained as more correct information compared with the related art.

Second Embodiment

The second embodiment will be described below. In the present embodiment, the phase difference detection portion 143A executes phase difference detection processing to be described below instead of the phase difference detection processing shown in FIG. 11. The other configuration and operation are the same as those of the above-described first embodiment. The same constituent elements as those in the first embodiment are given the same symbols, and description thereof is accordingly omitted.

Figure 17:
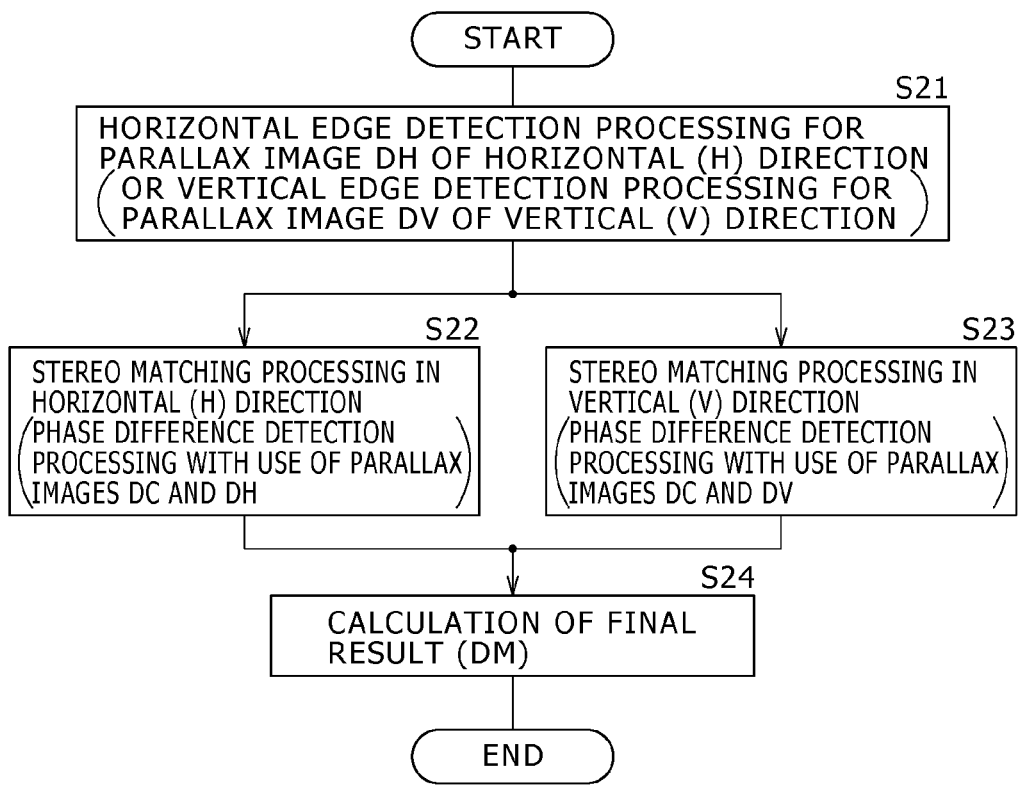
FIG. 17 is a flowchart showing operation of generating phase difference distribution in a second embodiment.

FIG. 17 is a flowchart showing operation of generating the phase difference distribution DM (phase difference detection processing) according to the present embodiment. In the present embodiment, in generation of the phase difference distribution DM, first, for at least one of plural parallax images along two or more directions, the phase difference detection portion 143A executes edge detection processing to detect an edge area along the parallax direction thereof. Concretely, in this embodiment, horizontal edge detection processing to detect an edge area along the horizontal direction (horizontal edge area) is executed for the parallax image DH along the horizontal direction. Alternatively, vertical edge detection processing to detect an edge area along the vertical direction (vertical edge area) is executed for the parallax image DV along the vertical direction (step S21 in FIG. 17).

Figure 18A:
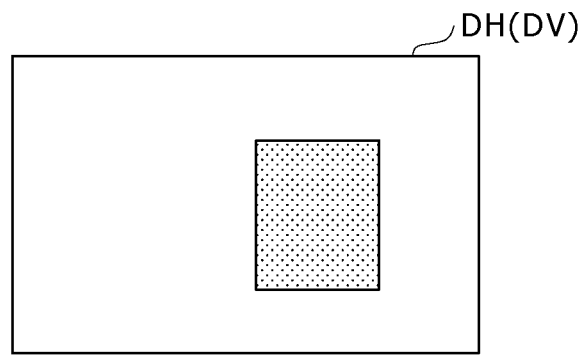
FIGS. 18A, 18B and 18C are schematic diagrams for explaining edge detection processing shown in FIG. 17.
Figure 18B:
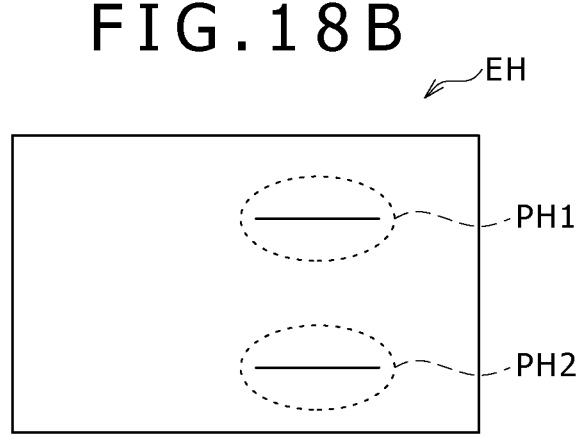
Figure 18C:
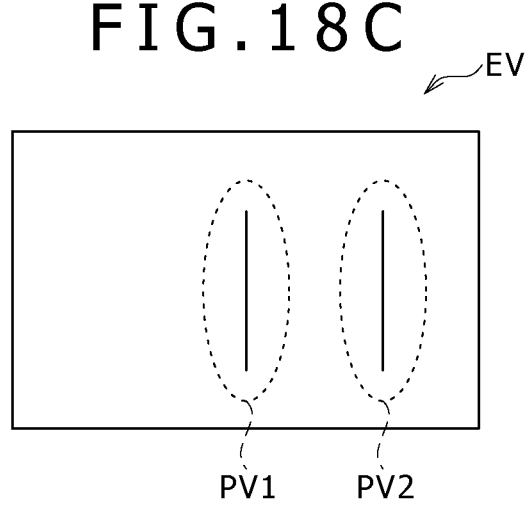

Specifically, for example if the horizontal edge detection processing is executed for the parallax image DH including edge areas shown in FIG. 18A, the horizontal edge detection result that e.g. horizontal edge areas PH1 and PH2 shown in FIG. 18B are detected is obtained. If the parallax image shown in FIG. 18A is the parallax image DV and the vertical edge detection processing is executed for this parallax image DV, the vertical edge detection result that e.g. vertical edge areas PV1 and PV2 shown in FIG. 18C are detected is obtained.

As the filter used in this edge detection processing (edge detection filter), e.g. the Sobel filter like those shown in FIGS. 19A and 19B is available. Specifically, e.g. the Sobel filter shown in FIG. 19A functions as a horizontal edge detection filter, and e.g. the Sobel filter shown in FIG. 19B functions as a vertical edge detection filter. If the pixel value in the image before edge detection processing is defined as img(x, y) and so forth and the pixel value in the image after the edge detection processing is defined as S(x, y) and so forth, the Sobel filters functioning as the horizontal edge detection filter and the vertical edge detection filter are represented by formulae (17) and (18), respectively, show below.

$$S(x,y) = \text{img}(x-1,y-1) + \text{img}(x-1,y+1) + \text{img}(x,y-1) + \text{img}(x,y+1) + \text{img}(x+1,y-1) + \text{img}(x+1,y+1) \quad (17)$$

$$S(x,y) = \text{img}(x-1,y-1) + \text{img}(x-1,y+1) + \text{img}(x,y-1) + \text{img}(x,y+1) + \text{img}(x+1,y-1) + \text{img}(x+1,y+1) \quad (18)$$

Subsequently, based on the edge detection result of the step S21, the phase difference detection portion 143A employs the result of the phase difference detection regarding a direction different from the direction of the detected edge area on each unit area basis and combines the results, to thereby generate the phase difference distribution DM. Concretely, in this embodiment, the phase difference detection portion 143A combines stereo matching processing in the horizontal direction (phase difference detection processing with use of the parallax images DC and DH) (step S22) and stereo matching processing in the vertical direction (phase difference detection processing with use of the parallax images DC and DV) (step S23).

Specifically, for the unit area from which no edge area is detected in the edge detection processing of the step S21, the phase difference detection portion 143A executes the phase difference detection processing along the same direction as the direction of this edge detection processing. Furthermore, for the unit area from which an edge area is detected in the edge detection processing, the phase difference detection portion 143A executes the phase difference detection processing along one of directions different from the direction of this edge detection processing. Due to this feature, in combining of these results of the phase difference detection in a step S24 to be described later, there is no unit area for which unnecessary (useless) phase difference detection processing is executed. Thus, the speed of the processing of the whole of the phase difference detection operation (operation of generating the phase difference distribution DM) is enhanced, and the calculation cost is also reduced.

More specifically, in this embodiment, for example if horizontal edge detection processing is executed in the step S21, phase difference detection processing along the horizontal direction is executed in the step S22 for the unit area from which no horizontal edge area is detected. On the other hand, for the unit area from which a horizontal edge area is detected, phase difference detection processing along the vertical direction is executed in the step S23.

For example if vertical edge detection processing is executed in the step S21, phase difference detection processing along the vertical direction is executed in the step S23 for the unit area from which no vertical edge area is detected. On the other hand, for the unit area from which a vertical edge area is detected, phase difference detection processing along the horizontal direction is executed in the step S22.

At last, the phase difference detection portion 143A combines the results of the phase difference detection regarding the horizontal direction and the vertical direction, performed in the steps S22 and S23, on each unit area basis to thereby generate the phase difference distribution DM as the final result (step S24).

In the above-described manner, also in the present embodiment, the susceptibility to the influence of an edge area in the phase difference detection can be lowered compared with the related art similarly to the above-described first embodiment. Thus, the more correct phase difference distribution DM can be generated compared with the related art. As a result, the distance information d (distance information distribution) obtained based on this phase difference distribution DM can also be obtained as more correct information compared with the related art.

In the present embodiment, as shown in FIG. 17, phase difference detection processing regarding the respective directions is executed after edge detection processing is executed. However, the order of the processing is not limited thereto but the processing may be executed in the reverse order for example. That is, the edge detection processing may be executed after the phase difference detection processing regarding the respective directions is executed. However, if the processing is executed in the order of the present embodiment, it is possible to execute selective phase difference detection processing for each unit area in consideration of the result of the edge detection processing as described above. Therefore, the order of the present embodiment can achieve higher speed of the processing of the whole of the phase difference detection operation (operation of generating the phase difference distribution DM) and lower calculation cost.

Application Example

An application example of the imaging device 1 described in the above-described first and second embodiments will be described below. The imaging device 1 according to these embodiments can be applied to e.g. a digital camera 3 to be described below, a position sensor, a biological sensor, and an optical microscope.

Figure 20A:
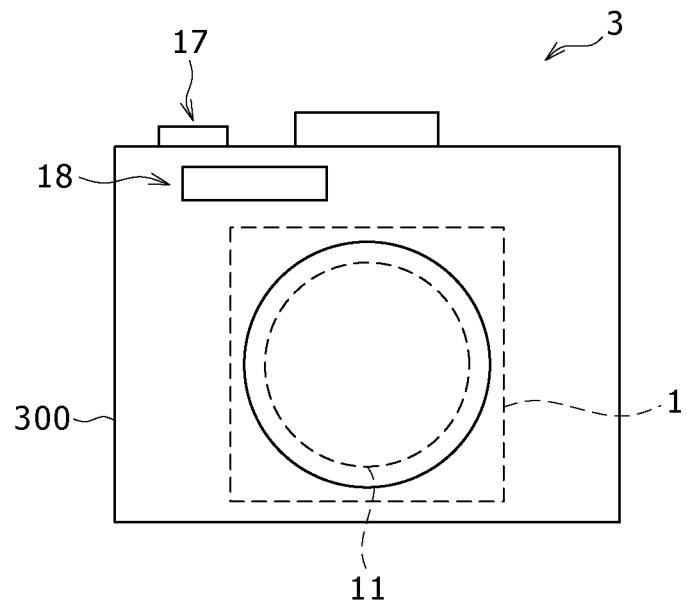
FIGS. 20A and 20B are diagrams showing the schematic configuration of a digital camera relating to one application example of the imaging device of the embodiment.
Figure 20B:
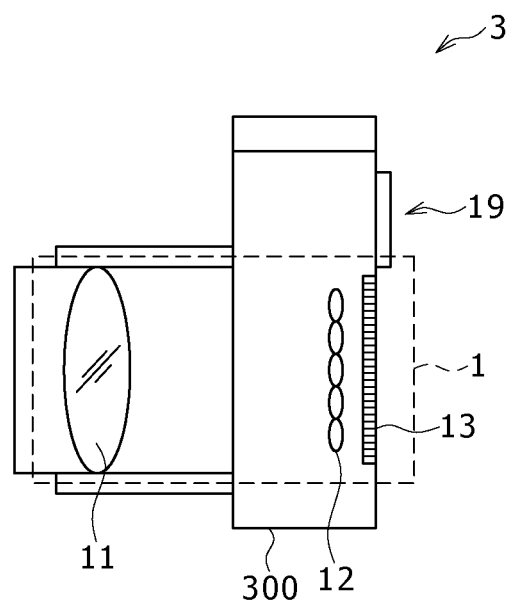

FIGS. 20A and 20B show the schematic configuration of the digital camera 3 including the above-described imaging device 1: FIG. 20A is a front view and FIG. 20B is a side view. This digital camera 3 includes the imaging device 1 inside a housing 300. In the upper part of the housing 300, a shutter button 17, a flash 18, a finder optical system 19, etc. are provided.

Modification Examples

In the above-described embodiments and so forth, the phase difference detection portion 143A generates the phase difference distribution DM by using three parallax images DC, DH, and DV. However, the phase difference distribution DM may be generated by using four or more parallax images.

Furthermore, phase difference detection processing is executed individually along the horizontal direction and the vertical direction in plural parallax images. However, phase difference detection processing along an oblique direction in the image may be utilized. That is, as long as the phase difference detection processing is executed individually along two or more directions different from each other, any direction can be used as the direction of the phase difference detection processing.

Moreover, the distance information d (information on the distance from the imaging lens 11 to the refocusing plane) is calculated based on the phase difference distribution DM generated by the phase difference detection portion 143A. However, the embodiments can be applied also to calculation of another parameter (e.g. intermediate parallax image generation processing or parallax enhancement processing) based on the generated phase difference distribution.

In addition, in the above-described embodiments and so forth, refocusing calculation processing by use of "light field photography" is described as one example of the image processing including rearrangement processing, executed in the image processing section 14. However, the image processing including rearrangement processing is not limited thereto but may be applied to e.g. focus blur processing or depth-of-field adjustment processing.

Furthermore, in the above-described embodiments, the image processing section 14 is treated as one of the constituent elements of the imaging device 1. However, this image processing section 14 does not necessarily need to be provided inside the imaging device 1. Specifically, the image processing section may be provided separately from the imaging device in the housing 300 of the digital camera 3 and this image processing section may execute image processing for imaging data obtained by the imaging device.

Moreover, in the above-described embodiments and so forth, the image processing section 14 executes image processing for the imaging data D0 obtained by an imaging optical system utilizing "light field photography" (imaging optical system having the imaging lens 11, the microlens array 12, and the imaging element 13). However, the present embodiments can be applied to data other than imaging data acquired by such an imaging optical system in the state in which the traveling direction of the light beam is retained. Specifically, for example, phase difference distribution may be generated based on plural parallax images acquired by using an imaging optical system having plural parallaxes.

In addition, in the above-described embodiments, the aperture stop 10 is disposed on the subject side (incidence side) of the imaging lens. However, the configuration is not limited thereto but the aperture stop 10 may be disposed on the image side (exit side) of the imaging lens or inside the imaging lens.

Furthermore, in the above-described embodiments and so forth, as one example of color filters, color filters of the Bayer arrangement, obtained through arrangement of color filters of three primary colors of red (R), green (G), and blue (B) in a checkered manner with a ratio of R:G:B=1:2:1, are employed. However, the color filters are not limited thereto but color filters of another arrangement, such as complementary color filters, may be used. As an example of such complementary color filters, color filters of four complementary colors of yellow (Y), magenta (M), cyan (C), and green (G), arranged in a checkered manner with a ratio of Y:M:C:G=1:1:1:1, are available.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An image processing device comprising:
a phase difference detection portion configured to detect a phase difference between parallax images by performing a correlation value calculation with a plurality of parallax images, and generate phase difference distribution in an image, wherein
the phase difference detection portion performs the phase difference detection individually along two or more directions different from each other to determine individual results along each of the two or more directions, and generates the phase difference distribution by combining the individual results of the phase difference detection regarding the two or more directions, wherein
the phase difference detection portion makes a determination as to reliability of phase difference for each of the results of the phase difference detection regarding the two or more directions on each unit area basis,
regarding at least one of parallax images of the two or more directions, the phase difference detection portion executes edge detection processing to determine a parallax direction of the at least one of parallax images,
the phase difference detection portion performs the phase difference detection along the same direction as a direction of the edge detection processing for a unit area from which no edge area is detected in the edge detection processing,
the phase difference detection portion performs the phase difference detection along one of directions different from the direction of the edge detection processing for a unit area from which an edge area is detected in the edge detection processing, and
the phase difference detection portion employs the result of the phase difference detection regarding a direction of highest reliability on each unit area basis and combines the results, based on results of the determination as to reliability, and a direction different from a direction of a detected edge area on each unit area basis and combines the results, based on a result of the edge detection, to thereby generate the phase difference distribution.

2. The image processing device according to claim 1, wherein
the phase difference detection portion makes the determination as to reliability based on a correlation characteristic line indicating a relationship between a pixel position and a correlation value in the correlation value calculation.

3. The image processing device according to claim 1, wherein
the phase difference detection portion performs the phase difference detection individually along a horizontal direction and a vertical direction in the plurality of parallax images, and
the phase difference detection portion generates the phase difference distribution by utilizing the result of the phase difference detection regarding the horizontal direction and the result of the phase difference detection regarding the vertical direction.

4. The image processing device according to claim 1, wherein
the plurality of parallax images are generated by an imaging optical system having an imaging lens, an imaging element to acquire imaging data based on a received light beam, and a microlens array that is disposed between the imaging lens and the imaging element and is configured by allocating one microlens to a plurality of pixels of the imaging element, based on imaging data acquired in a state in which traveling direction of a light beam is retained.

5. The image processing device according to claim 4, further comprising
a distance information calculation portion configured to calculate information on distance from the imaging lens to a refocusing plane based on the phase difference distribution generated by the phase difference detection portion.

6. The image processing device according to claim 5, further comprising
a refocusing factor setting portion configured to set a refocusing factor based on the information on distance calculated by the distance information calculation portion.

7. The image processing device according to claim 6, further comprising
a rearrangement processing block configured to execute rearrangement processing for the imaging data by using the refocusing factor set by the refocusing factor setting portion.

8. An image processing method comprising:
detecting a phase difference between parallax images by performing a correlation value calculation with a plurality of parallax images, and generating phase difference distribution in an image, wherein
the phase difference detection is performed individually along two or more directions different from each other to determine individual results along each of the two or more directions, and the phase difference distribution is generated by combining the individual results of the phase difference detection regarding the two or more directions, wherein
the phase difference detection portion makes a determination as to reliability of phase difference for each of the results of the phase difference detection regarding the two or more directions on each unit area basis,
regarding at least one of parallax images of the two or more directions, the phase difference detection portion executes edge detection processing to determine a parallax direction of the at least one of parallax images,
the phase difference detection portion performs the phase difference detection along the same direction as a direction of the edge detection processing for a unit area from which no edge area is detected in the edge detection processing,
the phase difference detection portion performs the phase difference detection along one of directions different from the direction of the edge detection processing for a unit area from which an edge area is detected in the edge detection processing, and
the phase difference detection portion employs the result of the phase difference detection regarding a direction of highest reliability on each unit area basis and combines the results, based on results of the determination as to reliability, and a direction different from a direction of a detected edge area on each unit area basis and combines the results, based on a result of the edge detection, to thereby generate the phase difference distribution.

9. An image processing computer program product stored on a non-transitory computer readable medium that when executed by a processor performs a step of:
detecting a phase difference between parallax images by performing a correlation value calculation with a plurality of parallax images, and generating phase difference distribution in an image, wherein the phase difference detection is performed individually along two or more directions different from each other to determine individual results along each of the two or more directions, and the phase difference distribution is generated by combining the individual results of the phase difference detection regarding the two or more directions, wherein the phase difference detection portion makes a determination as to reliability of phase difference for each of the results of the phase difference detection regarding the two or more directions on each unit area basis, regarding at least one of parallax images of the two or more directions, the phase difference detection portion executes edge detection processing to determine a parallax direction of the at least one of parallax images, the phase difference detection portion performs the phase difference detection along the same direction as a direction of the edge detection processing for a unit area from which no edge area is detected in the edge detection processing, the phase difference detection portion performs the phase difference detection along one of directions different from the direction of the edge detection processing for a unit area from which an edge area is detected in the edge detection processing, and the phase difference detection portion employs the result of the phase difference detection regarding a direction of highest reliability on each unit area basis and combines the results, based on results of the determination as to reliability, and a direction different from a direction of a detected edge area on each unit area basis and combines the results, based on a result of the edge detection, to thereby generate the phase difference distribution.

10. An imaging device comprising:

an imaging optical system; and an image processing device configured to execute image processing for imaging data acquired by the imaging optical system, wherein the image processing device has a phase difference detection portion that detects a phase difference between parallax images by performing correlation value calculation with a plurality of parallax images obtained from the imaging data directly or indirectly, and generates phase difference distribution in an image, and the phase difference detection portion performs the phase difference detection individually along two or more directions different from each other to determine individual results along each of the two or more directions, and generates the phase difference distribution by combining the individual results of the phase difference detection regarding the two or more directions, wherein the phase difference detection portion makes a determination as to reliability of phase difference for each of the results of the phase difference detection regarding the two or more directions on each unit area basis, regarding at least one of parallax images of the two or more directions, the phase difference detection portion executes edge detection processing to determine a parallax direction of the at least one of parallax images, the phase difference detection portion performs the phase difference detection along the same direction as a direction of the edge detection processing for a unit area from which no edge area is detected in the edge detection processing, the phase difference detection portion performs the phase difference detection along one of directions different from the direction of the edge detection processing for a unit area from which an edge area is detected in the edge detection processing, and the phase difference detection portion employs the result of the phase difference detection regarding a direction of highest reliability on each unit area basis and combines the results, based on results of the determination as to reliability, and a direction different from a direction of a detected edge area on each unit area basis and combines the results, based on a result of the edge detection, to thereby generate the phase difference distribution.

11. The imaging device according to claim 10, wherein the imaging optical system has an imaging lens, an imaging element to acquire the imaging data based on a received light beam, and a microlens array that is disposed between the imaging lens and the imaging element and is configured by allocating one microlens to a plurality of pixels of the imaging element, and the plurality of parallax images are generated based on the imaging data acquired in a state in which traveling direction of a light beam is retained.

12. An image processing device comprising:

a phase difference detection means for detecting a phase difference between parallax images by performing correlation value calculation with a plurality of parallax images, and generating phase difference distribution in an image, wherein the phase difference detection means performs the phase difference detection individually along two or more directions different from each other to determine individual results along each of the two or more directions, and generates the phase difference distribution by combining the individual results of the phase difference detection regarding the two or more directions, wherein the phase difference detection portion makes a determination as to reliability of phase difference for each of the results of the phase difference detection regarding the two or more directions on each unit area basis, regarding at least one of parallax images of the two or more directions, the phase difference detection portion executes edge detection processing to determine a parallax direction of the at least one of parallax images, the phase difference detection portion performs the phase difference detection along the same direction as a direction of the edge detection processing for a unit area from which no edge area is detected in the edge detection processing, the phase difference detection portion performs the phase difference detection along one of directions different from the direction of the edge detection processing for a unit area from which an edge area is detected in the edge detection processing, and the phase difference detection portion employs the result of the phase difference detection regarding a direction of highest reliability on each unit area basis and combines the results, based on results of the determination as to reliability, and a direction different from a direction of a detected edge area on each unit area basis and combines the results, based on a result of the edge detection, to thereby generate the phase difference distribution.

* * * * *